(12) United States Patent
Okamatsu et al.

(10) Patent No.: US 7,745,511 B2
(45) Date of Patent: Jun. 29, 2010

(54) EMULSION COAGULANT

(75) Inventors: Takahiro Okamatsu, Kanagawa (JP); Kazushi Kimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/174,732

(22) Filed: Jul. 17, 2008

(65) Prior Publication Data

US 2009/0023837 A1    Jan. 22, 2009

(30) Foreign Application Priority Data

Jul. 17, 2007   (JP) .............................. 2007-185817

(51) Int. Cl.
*B29C 73/00*   (2006.01)
(52) U.S. Cl. ...................................... 523/166
(58) Field of Classification Search .................. 523/166
See application file for complete search history.

(56) References Cited

U.S. PATENT DOCUMENTS

| | | | |
|---|---|---|---|
| 6,889,723 B2 | 5/2005 | Gerresheim et al. | |
| 6,992,119 B2 | 1/2006 | Kojima et al. | |
| 2006/0070167 A1* | 4/2006 | Eng et al. | 2/168 |

FOREIGN PATENT DOCUMENTS

| | | |
|---|---|---|
| DE | 1273179 B | 7/1968 |
| DE | 19753630 A1 | 6/1999 |
| DE | 60309387 T2 | 9/2007 |
| EP | 1382654 A1 | 1/2004 |
| EP | 1510329 A1 | 3/2005 |
| EP | 1693431 | 8/2006 |
| GB | 1046811 A | 12/1953 |
| JP | 2001062934 | 3/2001 |
| JP | 3210863 B2 | 7/2001 |
| JP | 2002-226636 | 8/2002 |
| JP | 2002-363331 | 12/2002 |
| JP | 2003-118009 | 4/2003 |
| JP | 2004035867 | 2/2004 |
| JP | 2005170973 | 6/2005 |
| JP | 2005-187751 | 7/2005 |
| JP | 2006-007748 | 1/2006 |
| JP | 2006-007748 A | 1/2006 |
| JP | 2006-063204 | 3/2006 |
| JP | 2007-056057 | 3/2007 |
| JP | 2007-056057 A | 3/2007 |

OTHER PUBLICATIONS

Office Action From the German Patent Office for the German Patent Application No. 102008033514.2 Which Was Received Dec. 3, 2009, Which Is Attached Along With Its English Translation.

* cited by examiner

*Primary Examiner*—Edward J Cain
(74) *Attorney, Agent, or Firm*—Connolly Bove Lodge & Hutz LLP (57) ABSTRACT

An emulsion coagulant for coagulating a tire puncture sealant containing emulsion particles includes a mineral which induces aggregation of the emulsion particles by one or both of weakening of surface charge of the emulsion particles and formation of hydrogen bond between the mineral and the emulsion particles, and a gelation agent. The emulsion coagulant enables easy recovery of the tire puncture sealant from a tire as well as easy disposal of the recovered sealant.

17 Claims, 1 Drawing Sheet

EMULSION COAGULANT

CROSS-REFERENCE TO RELATED APPLICATIONS

This application claims priority to JP 2007-185817, filed Jul. 17, 2007, the entire contents of all are hereby incorporated by reference.

The entire contents of literatures cited in this specification are incorporated herein by reference.

BACKGROUND OF THE INVENTION

This invention relates to an emulsion coagulant.

Various tire puncture sealants for repairing a punctured tire are proposed. Exemplary such tire puncture sealants include those prepared by blending a natural rubber latex with an emulsion of a tackifier resin and an antifreezing agent (see, for example, JP 2004-035867 A and JP 3210863 B), and those prepared by using a synthetic rubber latex such as acrylonitrile-butadiene rubber (NBR) latex or styrene-butadiene rubber (SBR) latex (see, for example, JP 2005-170973 A and JP 2001-62934 A).

In general, such tire puncture sealant is injected into a tire through an air-charging inlet of the tire and air is charged to a predetermined tire pressure, after which the car is driven to allow the tire puncture sealant to reach the puncture; and the compression and the shear generated during the tire rotation and contact of the tire with the ground cause the aggregation of the rubber particles in the tire to thereby seal the puncture and enable continuation of the driving.

In the case of the tire repaired with the tire puncture sealant, the tire contains the tire puncture sealant remaining in the tire in liquid state, and the tire is removed from the automobile in such condition. Therefore, after separating the rim from the tire, the tire puncture sealant remaining in the tire is collected, for example, in a bottle.

However, the recovered tire puncture sealant cannot be discarded without further treatment because the tire puncture sealant recovered generally contains an antifreezing agent such as ethylene glycol.

SUMMARY OF THE INVENTION

The inventor of the present invention also found that full recovery of the tire puncture sealant from the tire is difficult.

Accordingly, an object of the present invention is to provide an emulsion coagulant which enables easy recovery of the tire puncture sealant from the tire whereby the recovered puncture sealant can be discarded.

In view of the situation as described above, the inventor of the present invention made an intensive study, and found that an emulsion coagulant containing a mineral capable of inducing aggregation of emulsion particles in the tire puncture sealant by either one or both of weakening the surface charge of the emulsion particles and formation of hydrogen bond between the mineral and the emulsion particles, and a gelation agent is capable of realizing easy recovery of the tire puncture sealant from the tire and disposal of the recovered sealant.

The inventor of the present invention also found that a set comprising such emulsion coagulant and the tire puncture sealant enables easy recovery of the tire puncture sealant from the tire and disposal of the recovered sealant.

The inventor of the present invention also found that the method for recovering the tire puncture sealant using such emulsion coagulant enables easy recovery of the tire puncture sealant from the tire and disposal of the recovered sealant.

The inventor of the present invention has completed the present invention on the bases of such finding.

Accordingly, the present invention provides the following (1) to (16).

(1) An emulsion coagulant for coagulating a tire puncture sealant containing emulsion particles, comprising:
 a mineral which induces aggregation of the emulsion particles by either one or both of weakening of surface charge of the emulsion particles and formation of hydrogen bond between the mineral and the emulsion particles; and
 a gelation agent.

(2) The emulsion coagulant according to (1) above, wherein the mineral is at least one member selected from the group consisting of silicate, oxide, and carbonate.

(3) The emulsion coagulant according to (1) or (2) above, wherein the mineral is at least one member selected from the group consisting of alumina, sodium silicate, magnesium silicate, aluminum silicate, montmorillonite, bentonite, and zeolite.

(4) The emulsion coagulant according to any one of (1) to (3) above, wherein the gelation agent is at least one member selected from the group consisting of polyethylene oxide, polypropylene oxide, hydroxyethyl cellulose, and modified polymers thereof, and sodium alginate, propylene glycol alginate, and dibenzylidene sorbitol.

(5) The emulsion coagulant according to any one of (1) to (4) above, wherein the gelation agent is included in an amount of 20 to 700 parts by weight in relation to 100 parts by weight of the mineral.

(6) The emulsion coagulant according to (3) or (4) above, wherein the sodium silicate is at least one member selected from the group consisting of $Na_2SiO_3$, $Na_4SiO_4$, $Na_2Si_2O_5$, and $Na_2Si_4O_9$.

(7) The emulsion coagulant according to (6) above, wherein the sodium silicate is in the form of an aqueous solution.

(8) The emulsion coagulant according to (7) above, wherein the aqueous solution is water glass.

(9) The emulsion coagulant according to any one of (1), (6) to (8) above, wherein the mineral is sodium silicate, and the gelation agent is included in an amount of 6 to 20 parts by weight in relation to 100 parts by solid weight of the sodium silicate.

(10) A tire puncture sealant set comprising:
 a tire puncture sealant containing emulsion particles and an antifreezing agent; and
 the emulsion coagulant of any one of (1) to (9) above.

(11) The tire puncture sealant set according to (10) above, wherein the emulsion particles are present in the form of a natural rubber latex or a synthetic resin emulsion.

(12) The tire puncture sealant set according to (10) or (11) above, wherein the antifreezing agent is at least one member selected from the group consisting of ethylene glycol, propylene glycol, and diethylene glycol.

(13) The tire puncture sealant set according to any one of (10) or (12) above, wherein the tire puncture sealant further comprises a tackifier, and the tackifier is in the form of an emulsion containing at least one member selected from the group consisting of rosin resin, polymerized rosin resin, rosin ester resin, terpene resin, and terpene phenol resin.

(14) The tire puncture sealant set according to any one of (10) or (13) above, wherein the emulsion coagulant is used in an amount of 6 to 40 parts by weight in relation to 100 parts by weight of the tire puncture sealant.

(15) The tire puncture sealant set according to any one of (10) or (13) above, wherein the mineral in the emulsion coagulant is sodium silicate, and weight ratio of the sodium silicate to the gelation agent (the sodium silicate (parts by weight)/the gelation agent (parts by weight)) is 50/3 to 200/20 in relation 100 parts by weight of the tire puncture sealant.

(16) A method for recovering a tire puncture sealant from a tire, comprising the steps of:
adding the emulsion coagulant of any one of (1) to (9) above to the tire puncture sealant in the tire;
coagulating the tire puncture sealant with the emulsion coagulant to produce a coagulation product, and
recovering the coagulation product from the tire.

The emulsion coagulant of the present invention has enabled easy recovery of the tire puncture sealant from the tire as well as easy disposal of the recovered sealant.

The tire puncture sealant set of the present invention has also enabled easy recovery of the tire puncture sealant from the tire as well as easy disposal of the recovered sealant.

The method for recovering the tire puncture sealant of the present invention has also enabled easy recovery of the tire puncture sealant from the tire as well as easy disposal of the recovered sealant.

DETAILED DESCRIPTION OF THE INVENTION

Next, the present invention is described in further detail.

The emulsion coagulant of the present invention is an emulsion coagulant for coagulating a tire puncture sealant containing emulsion particles. The emulsion coagulant of the present invention contains a mineral and a gelation agent/and the mineral induces aggregation of the emulsion particles by one or both of weakening of the surface charge of the emulsion particles in the tire puncture sealant and formation of hydrogen bond between the mineral and the emulsion particles.

First, the mineral is described.

The mineral used in the emulsion coagulant of the present invention is not particularly limited as long as it induces aggregation of the emulsion particles by either one or both of weakening of the surface charge of the emulsion particles in the tire puncture sealant and formation of hydrogen bond between the mineral and the emulsion particles.

When the mineral is capable of inducing the aggregation of the emulsion particles by either one or both of weakening of the surface charge of the emulsion particles and formation of hydrogen bond between the mineral and the emulsion particles, and such mineral is used in combination with the emulsion particles, the mineral reduces stability (i.e. dispersibility) of the emulsion particles to cause aggregation of the emulsion particles.

It is to be noted that, in the present invention, the mineral includes both naturally occurring and synthetically produced minerals (such as water glass).

The surface charge as used herein refers to a surface charge of one emulsion particle or all the emulsion particles in the tire puncture sealant.

The emulsion particles may have a surface charge determined by the hydrophilic group of a polymer formed into the emulsion particles (the hydrophilic group can be introduced into the polymer by using a monomer having the hydrophilic group upon preparation of the emulsion), main chain structure of the polymer, an emulsifier and an emulsifying dispersant that may be used to disperse the emulsion particles and other factors.

Examples of the hydrophilic group that may be used include anionic groups such as carboxy group, sulfonate group and phosphate group; cationic groups such as amino group; and groups having a nonionic or anionic property such as hydroxy group. The hydrophilic groups may be used alone or in combination of two or more.

Examples of the emulsifier (or emulsifying dispersant) that may be used include surfactants such as nonionic surfactants, anionic surfactants, cationic surfactants and amphoteric surfactants. The emulsifiers (or emulsifying dispersants) may be used alone or in combination of two or more.

Zeta potential can be used to show the surface charge of the emulsion particles. The emulsion particles may have a positive (cationic) surface charge at a zeta potential of more than 0, in the case where the polymer formed into the emulsion particles has a cationic hydrophilic group (including the Case where the polymer also has an anionic hydrophilic group and the number of cationic hydrophilic groups is larger than the number of anionic hydrophilic groups, and/or the case where the cationic hydrophilic group is a strong base and the anionic hydrophilic group is a weak acid), or in the case where the emulsion particles include a cationic surfactant. The emulsion particles may have a negative (anionic) surface charge at a zeta potential of less than zero, in the case where the polymer formed into the emulsion particles has an anionic hydrophilic group (including the case where the polymer also has a cationic hydrophilic group and the number of anionic hydrophilic groups is larger than the number of cationic hydrophilic groups, and/or the case where the cationic hydrophilic group is a weak base and the anionic hydrophilic group is a strong acid), or in the case where the emulsion particles include an anionic surfactant. The emulsion particles may have no surface charge (have a surface charge of zero), or have a surface charge of around zero at a zeta potential of zero or around zero (for example, in the case where the polymer formed into the emulsion particles has no hydrophilic group) or in the case where the emulsion particles have a nonionic surfactant. The emulsion particles may have a nonionic (neutral) surface.

In the present invention, the zeta potential is measured with a zeta potential analyzer (ELSZ-2 manufactured by Otsuka Electronics Co., Ltd.) under the conditions of 23° C. and 65% RH.

In the case where the emulsion particles have a positive or negative surface charge, it is efficient to use an emulsion coagulant containing a mineral which has at least the action of weaking the surface charge of the emulsion particles (is capable of formation of covalent bond and/or ionic bond with the emulsion particles).

In the case where the emulsion particles have a nonionic surface charge, it is efficient to use an emulsion coagulant containing a mineral which has at least the action of forming hydrogen bond with the emulsion particles.

Referring to hydrogen bond between the emulsion particles and the mineral, in the case where the emulsion particles have oxygen atom whereas the mineral has hydrogen atom, or in the case where the emulsion particles have hydrogen atom whereas the mineral has oxygen atom, hydrogen bond can be formed between the emulsion particles and the mineral.

For example, a mineral having a surface charge opposite to that of the emulsion particles may be used to weak the surface charge of the emulsion particles, namely, to reduce the surface charge of the emulsion particles or to allow the emulsion particles in the tire puncture sealant after addition of the emulsion coagulant to have a smaller surface charge than before addition of the emulsion coagulant. A mineral having a surface charge opposite to that of the emulsion particles may be used to form covalent bond and/or ionic bond between the emulsion particles and the mineral.

The mineral may preferably have a surface charge opposite to that of the emulsion particles in view of its capability of weakening of the surface charge of the emulsion particles.

In a preferable embodiment, when the emulsion particles have positive surface charge (namely/when the emulsion particles are cationic), the mineral may have a negative surface charge (namely, the mineral may be anionic).

In another preferable embodiment, when the emulsion particles have positive surface charge (namely, when the emulsion particles are anionic), the mineral may have a positive surface charge (namely, the mineral may be cationic).

Exemplary negatively charged minerals include alumina, sodium silicate, bentonite, magnesium silicate, aluminum silicate, montmorillonite, saponite, beidellite, hectorite, stevensite, talc, kaolin, smectite, and sepiolite.

In view of the ease of aggregating with the emulsion particles in the tire puncture sealant and ease of separating the tire puncture sealant from the tire to enable disposal of the tire puncture sealant, the mineral is preferably at least one member selected from the group consisting of alumina, sodium silicate, magnesium silicate, aluminum silicate, montmorillonite, bentonite, and zeolite, and more preferably at least one member selected from the group consisting of alumina, bentonite, sodium silicate, and magnesium silicate.

Exemplary positively charged minerals include calcium carbonate.

Exemplary minerals which are capable of aggregating the emulsion particles by forming hydrogen bond between the mineral and the emulsion particles include alumina, bentonite, sodium silicate, magnesium silicate, aluminum silicate, montmorillonite, saponite, beidellite, hectorite, stevensite, talc, kaolin, smectite, sepiolite, and calcium carbonate.

In other words, the minerals may include silicates, oxides, and carbonates, for example.

Exemplary silicates include sodium silicate, magnesium silicate, aluminum silicate, silicon dioxide; clay minerals such as smectite such as montmorillonite, bentonite, zeolite, kaolinate and vermiculite; and amorphous silicate such as water glass.

In view of the ease of gelating and aggregating the emulsion particles in the tire puncture sealant or the aggregates of the emulsion particles and the mineral and ease of separating the tire puncture sealant from the tire to enable disposal of the tire puncture sealant, as well as highly safe handling, the mineral is preferably magnesium silicate, aluminum silicate, sodium silicate, a clay mineral, or water glass, and more preferably, sodium silicate, a clay mineral, or water glass.

Magnesium silicate is not particularly limited, Exemplary magnesium silicates include magnesium metasilicate ($MgSiO_3$), magnesium orthosilicate ($Mg_2SiO_4$), magnesium trisilicate ($Mg_2Si_3O_8$), magnesium mesotrisilicate, and serpentine ($Mg_3Si_2O_7$).

Exemplary sodium silicates include $Na_2SiO_3$, $Na_4SiO_4$, $Na_2Si_2O_5$, and $Na_2Si_4O_9$. More specifically, the sodium silicate is preferably at least one member selected from the group consisting of $Na_2SiO_3$, $Na_4SiO_4$, $Na_2Si_2O_5$, and $Na_2Si_4O_9$ in view of the ease of gelating and aggregating the emulsion particles in the tire puncture sealant or the aggregates of the emulsion particles and the mineral and ease of separating the tire puncture sealant from the tire to enable disposal of the tire puncture sealant, as well as highly safe handling.

Oxides are oxides of metal. Exemplary oxides include alumina, iron oxide, titanium oxide, and magnesium oxide.

Alumina is not particularly limited, and examples include those known in the art.

Carbonates are carbonates of metal. Exemplary carbonates include calcium carbonate, and magnesium carbonate.

The mineral is preferably a powder mineral in view of the handling convenience.

The mineral is also preferably in the form of an aqueous solution in view of its excellent compatibility with the tire puncture sealant.

In another preferable embodiment, the mineral is preferably, alumina, magnesium, silicate, or water glass (concentrated aqueous solution), and more preferably, alumina, magnesium silicate in view of easily gelating and aggregating the emulsion particles in the tire puncture sealant or the aggregates of the emulsion particles and the mineral and further facilitating separation of the tire puncture sealant from the tire and its disposal, as well as achieving excellent handling properties because the tire puncture sealant can be discarded as in general waste when it is gelated, whereas the tire puncture sealant which remains liquid must be treated as industrial waste, thus increasing the environmental burdens and costs.

Water glass preferably contains at least one sodium silicate selected from the group consisting of $Na_2SiO_3$, $Na_4SiO_4$, $Na_2Si_2O_5$, and $Na_2Si_4O_9$ for the same reasons as above.

The mineral used may be a commercially available product.

The minerals may be used alone or a combination of two or more.

Next, the gelation agent is described.

The gelation agent incorporated in the emulsion coagulant of the present invention is not particularly limited as long as it contains at least one or both of water-absorbing and oil-absorbing properties.

Exemplary gelation agents include a polyoxyalkylene polyol such as polyethylene oxide, polypropylene oxide, or diethylene glycol; a modified polymer of polyoxyalkylene polyol such as AQUACALK TWB manufactured by Sumitomo Seika Chemicals Company Limited; a polysaccharide such as sodium alginate, hydroxyethyl cellulose, or propylene glycol alginate; and a sugar alcohol such as dibenzylidene sorbitol, bis(p-methylbenzylidene) sorbitol.

Among these, the gelating agent is preferably the one having both water-absorbing and oil-absorbing properties in view of the ease of gelating the mixed solution of water and the antifreezing agent and the ease of separating the tire puncture sealant from the tire to enable disposal of the tire puncture sealant.

More particularly, the gelating agent is preferably at least one member selected from the group consisting of polyethylene oxide, polypropylene oxide, hydroxyethyl cellulose, and modified polymers thereof, sodium alginate, propylene glycol alginate, and dibenzylidene sorbitol, and more preferably propylene glycol alginate in view of the ease of gelating the mixed solution of water and the antifreezing agent and the ease of separating the tire puncture sealant from the tire to enable disposal of the tire puncture sealant.

The gelation agent is preferably in the form of powder in view of the handling convenience.

The gelation agent may be a commercially available product.

The gelation agents may be used alone or in combination of two or more.

The gelation agent is preferably incorporated in an amount in the range of 20 to 700 parts by weight, and more preferably 60 to 200 parts by weight in relation to 100 parts by weight of the mineral in view of the ease of gelating and aggregating the emulsion particles in the tire puncture sealant or the aggregates of the emulsion particles and the mineral and ease of separating the tire puncture sealant from the tire to enable disposal of the tire puncture sealant.

When the mineral is sodium silicate, the gelation agent is preferably incorporated in an amount in the range of 6 to 20 parts by weight, and more preferably 8 to 17 parts by weight in relation to 100 parts by solid weight of the sodium silicate, in view of the ease of gelating and aggregating the emulsion particles in the tire puncture sealant or the aggregates of the emulsion particles and the mineral, and the ease of separating the tire puncture sealant from the tire to enable disposal of the tire puncture sealant.

In addition to the mineral and the gelation agent, if desired, the emulsion coagulant of the present invention may optionally contain additives such as a filler, an antiaging agent, an antioxidant, a pigment (dye), a plasticizer, a thixotropic agent, a UV absorber, a flame retardant, a surfactant (including a leveling agent), a dispersant, a dehydrating agent, and an antistatic agent.

Organic or inorganic fillers of various forms may be used for the filler. Exemplary fillers include fumed silica, calcined silica, precipitated silica, pulverized silica, molten silica; diatomaceous earth; iron oxide, zinc oxide, titanium oxide, barium oxide, magnesium oxide; calcium carbonate, magnesium carbonate, zinc carbonate; pyrophyllite clay, kaolin clay, calcined clay; carbon black; fatty acid-treated products thereof, resin acid-treated products thereof, urethane compound-treated products, and fatty acid ester-treated products.

Exemplary antiaging agents include hindered phenol compounds.

Exemplary antioxidants include butylhydroxytoluene (BHT), and butylhydroxyanisole (BHA).

Exemplary pigments include inorganic pigments such as titanium oxide, zinc oxide, ultramarine, red oxide, lithopone, lead, cadmium, iron, cobalt, aluminum, hydrochloride, and sulfate; and organic pigments such as azo pigments, phthalocyanine pigments, quinacridone pigments, quinacridonequinone pigments, dioxazine pigments, anthrapyrimidine pigments, anthanthrone pigments, indanthrone pigments, flavanthrone pigments, perylene pigments, perinone pigments, diketopyrrolopyrrole pigments, quinonaphthalone pigments, anthraquinone pigments, thioindigo pigments, benzimidazolone pigments, isoindoline pigments, and carbon black.

Exemplary plasticizers include diisononyl phthalate (DINP); dioctyl adipate, isodecyl succinate; diethylene glycol dibenzoate, pentaerythritol ester; butyl oleate, methyl acetyl ricinoleate; tricresyl phosphate, trioctyl phosphate; adipic acid propylene glycol polyester, and adipic acid butylene glycol polyester.

Exemplary thixotropic agents include AEROSIL (manufactured by Nippon Aerosil Co., Ltd.) and DISPARLON (manufactured by Kusumoto Chemicals, Ltd.).

Exemplary flame retardants include chloroalkyl phosphate, dimethyl methylphosphonate, bromine-phosphorus compounds, ammonium polyphosphate, neopentyl bromide polyether, and brominated polyether.

Exemplary antistatic agents include quaternary ammonium salts; and hydrophilic compounds such as polyglycol and ethylene oxide derivatives.

The emulsion coagulant of the present invention is not limited for its production process. For example, it may be produced by homogeneously mixing the mineral, the gelation agent, and the optionally used additive.

The emulsion coagulant of the present invention is preferably in the form of powder in view of the handling convenience, ease of coagulating and gelating the tire puncture sealant, and ease of separating the tire puncture sealant from the tire to enable disposal of the tire puncture sealant.

When the emulsion coagulant of the present invention is in the form of powder, the powder may have an average particle size of about 0.01 to 1 mm in view of handling convenience, ease of coagulating and gelating the tire puncture sealant, and ease of separating the tire puncture sealant from the tire to enable disposal of the tire puncture sealant.

In one preferable embodiment, the emulsion coagulant of the present invention is liquid.

The emulsion coagulant of the present invention is the one which can be used for coagulation of the tire puncture sealant.

The mineral in the emulsion coagulant of the present invention has the effect of reducing stability of the emulsion particles by either one or both of weakening of the surface charge of the emulsion particles in the tire puncture sealant and formation of hydrogen bond between the mineral and the emulsion particles.

When the emulsion coagulant of the present invention is added to the tire puncture sealant, the mineral reacts with the hydrophilic group in the emulsion particles of the tire puncture sealant and the emulsifier or emulsifying dispersant (for example, a surfactant such as polyvinyl alcohol), and as a consequence of such reaction, one or both of weakening of the surface charge of the emulsion particles and formation of hydrogen bond between the mineral and the emulsion particles occur to broke the emulsion particles, thus inducing their secondary aggregation.

Accordingly, when the emulsion coagulant of the present invention is mixed with the tire puncture sealant, the mineral can efficiently aggregate the emulsion particles, and the time required for the aggregation can be reduced.

In addition, since the emulsion coagulant of the present invention contains a gelation agent, the entire mixture of the emulsion coagulant of the present invention and the tire puncture sealant (containing the aggregate of the emulsion particles and the mineral; the gelation agent; and other additives in the tire puncture sealant such as a tackifier, water, and an antifreezing agent) can be gelated to facilitate separation of the gelated sealant from the tire. Handling convenience is also realized since the entire gelated sealant will be more readily separated from the tire compared to the case of the liquid state sealant. The thus recovered sealant can be discarded as general waste.

It is to be noted that the mechanism as described above is based on the estimation of the inventor of the present invention, and the present invention is not at all limited by such estimation.

Next, the tire puncture sealant set of the present invention is described.

The tire puncture sealant set of the present invention comprises a tire puncture sealant containing emulsion particles and an antifreezing agent, and the emulsion coagulant of the present invention.

The tire puncture sealant used in the tire puncture sealant set of the present invention is not particularly limited, and the tire puncture sealant used may be the one containing emulsion particles, a tackifier, and an antifreezing agent.

Next, the emulsion particles incorporated in the tire puncture sealant are described.

The emulsion particles incorporated in the tire puncture sealant of the tire puncture sealant set of the present invention are present in the form of, for example, a natural rubber latex or a synthetic resin emulsion.

The rubber latex incorporated as emulsion particles in the tire puncture sealant is not particularly limited, and examples include those known in the art. More specifically, the rubber latex may be either a natural rubber latex; or a synthetic rubber latex such as styrene-butadiene rubber (SBR), acrylonitrile-butadiene rubber (NBR), or chloroprene rubber (CR). The rubber latex is not limited for its production process, and exemplary processes include those used in the art. The emulsifying dispersant used in producing the rubber latex is not particularly limited, and the dispersant used may be the same as those used in producing the acrylic emulsion as described below.

The synthetic resin emulsion used for the emulsion particles in the tire puncture sealant is not particularly limited, and examples include those known in the art.

Exemplary synthetic resin emulsions include urethane emulsion, acrylic emulsion, polyolefin emulsion, ethylene vinyl acetate emulsion, vinyl acetate emulsion, and polyvinyl chloride emulsion.

The synthetic resin emulsion used is preferably the one having a relatively good stability at a pH in the range of 5.5 to 8.5.

A single type or two or more types of emulsion particles may be used.

Among these, the preferred are ethylene vinyl acetate emulsion, natural rubber latex, and SBR emulsion in view of their availability and cost. The natural rubber latex is not particularly limited, and examples include those known in the art, SBR is not particularly limited, and examples include those known in the art.

<Urethane Emulsion>

The urethane emulsion is obtained by dispersing polyurethane particles in water. A preferable example of the urethane emulsion include one obtained by reacting an ionizable group-containing urethane prepolymer with an emulsifying dispersant in water.

Exemplary urethane prepolymers are those obtained by copolymerizing a polyisocyanate compound (A) having two or more isocyanate groups, a compound (B) having two or more active hydrogen atoms, and a compound (C) having a group reactive with the isocyanate group and an ionizable group.

The polyisocyanate compound (A) may be any of various polyisocyanate compounds commonly used in the production of a polyurethane resin. Exemplary such polyisocyanate compounds include tolylene diisocyanates (TDI) such as 2,4-tolylene diisocyanate and 2,6-tolylene diisocyanate; diphenylmethane diisocyanate (MDI) such as diphenylmethane-4,4'-diisocyanate; tetramethylxylylene diisocyanate (TMXDI); trimethylhexamethylene diisocyanate (TMHMDI); 1,5-naphthalene diisocyanate; ethylene diisocyanato; propylene diisocyanate; tetramethylene diisocyanate; hexamethylene diisocyanate (HDI); isophorone diisocyanate (IPDI); xylylene diisocyanate (XDI); triphenylmethane triisocyanate; diisocyanate with norbornane skeleton (NBDI); and modified products such as isocyanurates derived therefrom.

These polyisocyanate compounds may be used alone or in combination of two or more.

Of these isocyanate group-containing compounds, TDI and MDI are preferable. These are general purpose polyisocyanates and therefore are inexpensive and readily available.

The compound (B) is not particularly limited as long as it is a compound having two or more active hydrogen atoms. Exemplary such compounds include a polyol compound, an amine compound, and an alkanolamine. These compounds may be used alone or in combination of two or more.

Among these, the polyol compound is preferable.

Exemplary polyol compounds include polyether polyols such as polytetramethylene glycol, polyethylene glycol, polypropylene glycol, polyoxypropylene glycol, and polyoxybutylene glycol; polycaprolactone polyols; polycarbonate polyols; polyolefin polyols such as polybutadiene polyol and polyisoprene polyol; adipate polyols; and polyester polyols such as castor oil. These polyol compounds may be used alone or in combination of two or more.

Among these, the polyether polyols, polycaprolactone polyols, polycarbonate polyols, and polyester polyols are preferable, and the polyether polyols and polyester polyols are more preferable in terms of their excellent storage stability.

The polyol compound may have a number average molecular weight of preferably about 500 to 10,000 and more preferably about 2,000 to 6,000.

Exemplary amine compounds include ethylenediamine and hexamethylenediamine.

Exemplary alkanolamines include ethanolamine and propanolamine.

The compound (C) is a compound having a group reactive with isocyanate group and an ionizable group.

Exemplary groups which are reactive with the isocyanate group include hydroxy group, amino group ($-NH_2$), imino group ($-NH-$), and mercapto group.

The term "ionizable group" as used herein refers to a group which may become positively or negatively charged by neutralization, and specifically refers to an anionic group or a cationic group.

The term "anionic group" refers to a group that may be negatively charged by neutralization with a base. Exemplary anionic groups that may be preferably used include carboxy group, sulfo group, and phosphate group. The term "cationic group" refers to a group that may be positively charged by neutralization with an acid or reaction with a quaternizing agent. Exemplary such cationic groups that may be preferably used include a tertiary amino group.

When the ionizable group is an anionic group, pH adjustment of the tire puncture sealant is generally unnecessary. In addition, the resulting tire puncture sealant has no pungent odor and hardly causes corrosion of steel cord, and therefore is preferable.

Exemplary compounds having the group reactive with isocyanate group and the anionic group (hereinafter referred to as the "compound (C1)") include: aliphatic monohydroxycarboxylic acids such as hydroxyacetic acid, hydroxypropionic acid, and hydroxybutyric acid; aromatic monohydroxycarboxylic acids such as hydroxybenzoic acid, hydroxyethylbenzoic acid, and hydroxycinnamic acid; dihydroxycarboxylic acids such as dimethylolpropionic acid, dimethylolbutanoic acid, and dimethylolacetic acid; mercaptocarboxylic acids such as mercaptoacetic acid, mercaptopropionic acid, and mercaptobenzoic acid; aminocarboxylic acids such as aminoadipic acid and aminobenzoic acid; hydroxysulfonic acids such as hydroxybenzenesulfonic acid; mercaptosulfonic acids such as 3N-mercaptoethanesulfonic acid; and aminosulfonic acids such as aminobenzenesulfonic acid. These compounds may be used alone or in combination of two of more.

Preferable examples of the compound having the group reactive with isocyanate group and the cationic group (hereinafter referred to as the "compound (C2)") include a compound having the group reactive with isocyanate group and a tertiary amino group.

Exemplary preferable compounds that may be used include a compound represented by the following formula (1):

wherein R represents an alkyl group or a hydroxyalkyl group containing 1 to 4 carbon atoms, and $R^1$ and $R^2$ may be the same or different and each independently represent an alkylene group containing 1 to 4 carbon atoms.

Examples of the compound represented by the formula (1) include a diol compound having a tertiary amino group and a triol compound having a tertiary amino group.

Examples of the compound (C2) include alkanolamines such as N-methyl-N,N-diethanolamine, N-ethyl-N,N-diethanolamine, N-isobutyl-N,N-diethanolamine, diisopropanolamine, and triethanolamine. These may be used alone or in combination of two or more.

The method of producing the urethane prepolymer is not particularly limited, but may be, for example, a method in which the polyisocyanate compound (A), the compound (B), and the compound (C) are simultaneously stirred for polymerization.

In the production of the urethane prepolymer, the order of adding the compound (B) and the compound (C) is not particularly limited and they may be simultaneously added or one of them may be added first. An exemplary method that may be used involves reacting the polyisocyanate compound (A) and the compound (B) according to a common urethane prepolymer production method to produce the urethane prepolymer, then adding the compound (C) to the urethane prepolymer for addition polymerization.

The copolymerization is preferably carried out such that the content of the isocyanate groups in the resulting urethane prepolymer (NCO %) is in the range of 0.3 to 3%.

In a preferred embodiment, 1 to 50% by weight of the polyisocyanate compound (A), 30 to 90% by weight of the compound (B), and 0.1 to 20% by weight of the compound (C) are mixed with respect to the total weight of the polyisocyanate compound (A), the compound (B), and the compound (C), and the mixture is stirred at 60 to 90° C. for about 2 to 8 hours in an inert gas atmosphere. NCO % as used herein means a weight percentage of the NCO groups with respect to the total weight of the urethane prepolymer.

The copolymerization may be carried out optionally in the presence of a urethanation catalyst such as an organotin compound, organobismuth, or amine, and preferably in the presence of an organotin compound.

Exemplary organotin compounds include stannous carboxylates such as stannous acetate, stannous octanoate, stannous laurate, and stannous oleate; dialkyltin salts of carboxylic acids such as dibutyltin acetate, dibutyltin dilaurate, dibutyltin maleate, dibutyltin di-2-ethylhexoate, dilauryltin diacetate, and dioctyltin diacetate; trialkyltin hydroxides such as trimethyltin hydroxide, tributyltin hydroxide, and trioctyltin hydroxide; dialkyltin oxides such as dibutyltin oxide, dioctyltin oxide, and dilauryltin oxide; and dialkyltin chlorides such as dibutyltin dichloride and dioctyltin dichloride. These may be used alone or in combination of two or more.

Among these, dibutyltin dilaurate, dibutyltin acetate, and dibutyltin maleate are preferable in terms of their relatively low cost and ease of handling.

The urethane prepolymer that may be obtained by the copolymerization as described above has a weight average molecular weight of preferably 1,500 to 30,000 and more preferably 3,000 to 20,000.

The urethane prepolymer is emulsified by reacting with an emulsifying dispersant in water, resulting in a stabilized urethane emulsion. When a urethane prepolymer having a cationic group is used, a quaternizing agent may be used as the emulsifying dispersant.

When a urethane prepolymer having an anionic group is used, a base may be used for the emulsifying dispersant without any particular limitation, as long as the base is a Lewis base. Specific examples thereof include sodium hydroxide, potassium hydroxide, and tertiary amine. These may be used alone or in combination of two or more. Of these, triethylamine is preferable.

When a urethane prepolymer having a cationic group is used, an acid may be used for the emulsifying dispersant without any particular limitation, as long as the acid is a Lewis acid. Specific examples thereof include inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. These may be used alone or in combination of two or more. Among these, hydrochloric acid and acetic acid are preferable.

The quaternizing agent is a compound that may quaternize the tertiary amino group of the urethane prepolymer. Specific examples of the quaternizing agent include epoxy compounds such as ethylene oxides propylene oxide, butylene oxide, styrene oxide, and epichlorohydrin; dialkyl sulfates such as dimethyl sulfate and diethyl sulfate; alkyl sulfonates such as methyl p-toluenesulfonate; and alkyl halides such as methyl chloride, ethyl chloride, benzyl chloride, methyl bromide, and ethyl bromide.

The urethane prepolymer can be dispersed in water by optionally adding a viscosity modifier or a chain extender in addition to the above-mentioned emulsifying dispersant.

The viscosity modifier may be an organic solvent having compatibility with water. Specific examples of the viscosity modifier that may be preferably used include ethyl acetate, acetone, and methyl ethyl ketone.

Exemplary chain extenders include aliphatic diamines such as ethylenediamine, propylenediamine, hexamethylenediamine, and triethylenetetramine; alicyclic diamines such as isophoronediamine and piperazine; aromatic diamines such as diphenyldiamine; and triamines.

The method used for producing the urethane emulsion is not particularly limited, but may be, for example, a method in which the urethane prepolymer and the emulsifying dispersant, and optionally the viscosity modifier and/or the chain extender are added to water and mixed with stirring.

<Acrylic Emulsion>

The acrylic emulsion is not particularly limited and any known acrylic emulsion may be used.

The acrylic emulsion is preferably an aqueous emulsion prepared by polymerization (emulsion polymerization) of any of, for example, methacrylate, acrylate, aromatic vinyl monomer, unsaturated nitrile, conjugated diolefin, polyfunctional vinyl monomer, amide monomer, hydroxy group-containing monomer, caprolactone-addition monomer, amino group-containing monomer, glycidyl group-containing monomer, acid monomer, and vinyl monomerx, with an emulsifying dispersant.

Examples of the methacrylate include methyl methacrylate, ethyl methacrylate, butyl methacrylate, hexyl methacrylate, cyclohexyl methacrylate, nonyl methacrylate, and lauryl methacrylate.

Examples of the acrylate include butyl acrylate, hexyl acrylate, and 2-ethylhexyl acrylate.

Examples of the aromatic vinyl monomer include p-methylstyrene, α-methylstyrene, p-chlorostyrene, chloromethylenestyrene, and vinyltoluene.

Examples of the unsaturated nitrile include acrylonitrile and methacrylonitrile.

Examples of the conjugated diolefin include butadiene, isoprene, and chloroprene.

Examples of the polyfunctional vinyl monomer include divinylbenzene, ethylene glycol diacrylate, ethylene glycol dimethacrylate, diethylene glycol diacrylate, diethylene diglycol dimethacrylate, allyl methacrylate, diallyl phthalate, trimethylolpropane triacrylate, glycerol diallyl ether, polyethylene glycol dimethacrylate, and polyethylene glycol diacrylate.

Examples of the amide monomer include acrylamide, methacrylamide, and N-methylol methacrylamide.

Examples of the hydroxy group-containing monomer include β-hydroxyethyl acrylate and β-hydroxyethyl methacrylate.

Examples of the caprolactone-addition monomer include β-hydroxyethyl acrylates and β-hydroxy methacrylates such as FA-1, FA-2, FA-3, and FM-1 manufactured by Daicel chemical Industries, Ltd.

Examples of the amino group-containing monomer include dimethylaminoethyl acrylate and diethylaminoethyl acrylate.

Examples of the glycidyl group-containing monomer include glycidyl acrylate and diglycidyl methacrylate.

Examples of the acid monomer include acrylic acid, methacrylic acid, itaconic acid, and p-vinylbenzoic acid.

Examples of the vinyl monomer include vinyl acetate, vinyl chloride, and vinylidene chloride.

Among these, the acrylate and methacrylate are preferable in terms of their cost, ease of handling, and physical properties.

Examples of the emulsifying dispersant include a nonionic surfactant, an anionic surfactant, a cationic surfactant, and an amphoteric surfactant. Of these, the nonionic surfactant is preferable because of its neutrality and less odor.

Examples of the nonionic surfactant include ones containing hydroxy group such as polyvinyl alcohol (PVA), hydroxyethyl cellulose (HEC), fatty acid sorbitan ester, polyoxyethylene fatty acid sorbitan, polyoxyethylene higher alcohol ether, polyoxyethylene-propylene higher alcohol ether, polyoxyethylene fatty acid ester, polyoxyethylene alkyl phenol ether, polyoxyethylene alkylamine, and polyoxyethylene-polyoxypropylene block polymer.

Polyvinyl alcohol (PVA) and hydroxyethyl cellulose (HEC) are preferably used for the nonionic surfactant in view of more easily forming hydrogen bond with the mineral.

Examples of the anionic surfactant include alkali metal salts of fatty acids, alkyl sulfates, alkyl ether sulfates, alkyl benzene sulfonates, N-acyl-N-methyl taurinates, dialkyl sulfosuccinates, and N-alkyl-N,N-dimethyl oxides.

Examples of the cationic surfactant include alkylamine acetates and quaternary ammonium salts such as alkyl trimethyl ammonium chloride.

Examples of the amphoteric surfactant include dimethyl alkyl betaine and alkylamide betaine.

A reactive surfactant having a reactive double bond in the molecule, a water-soluble polymer such as polyvinyl alcohol or starch may be used for the emulsifying dispersant.

The emulsifying dispersants may be used alone or in combination of two or more.

The acrylic emulsion has a weight average molecular weight of preferably 10,000 to 500,000 and more preferably 50,000 to 200,000.

The acrylic emulsion has a solid content of preferably 30 to 60% by weight and more preferably 40 to 55% by weight.

In the present invention, a commercially available product may be used for the acrylic emulsion and examples thereof include A6001 manufactured by Regitex Co., Ltd., and Lx823 manufactured by Zeon Corporation.

<Polyolefin Emulsion>

The polyolefin emulsion is not particularly limited, and any known polyolefin emulsion may be used.

For example, an emulsion in water of a polyolefin having a hydrophilic group introduced therein may be used for the polyolefin emulsion. Examples of the hydrophilic group include carboxy group, sulfonate group, phosphate group, hydroxy group, and amino group.

Examples of the polyolefin emulsion include a polyethylene emulsion, a polypropylene emulsion, an ethylene-propylene copolymer emulsion, and a polybutene emulsion.

These may be used alone or in combination of two or more.

The polyethylene emulsion is not particularly limited, and any known polyethylene emulsion may be used.

For example, an emulsion in water of polyethylene having a hydrophilic group introduced therein may be used for the polyethylene emulsion. Examples of the hydrophilic group include carboxy group, sulfonate group, phosphate group, hydroxy group, and amino group.

The emulsifying dispersant used may be the same as the one described for the acrylic emulsion.

The polyethylene preferably has a melting point of 90 to 150° C. and a weight average molecular weight of 1,000 to 1,000,000.

The term "melting point" as used herein refers to a value obtained by the measurement according to a softening point testing method (ring and ball method) as defined in JIS K2207.

In the present invention, a commercially available product may be used for the polyethylene emulsion and examples thereof include JW-150 manufactured by Johnson Polymer, Wax Dispersion W867 manufactured by Clariant, Nopcoat PEM-17 manufactured by San Nopco Ltd., and PE401 manufactured by Naruse Chemical Co., Ltd.

The polypropylene emulsion is not particularly limited, and any known polypropylene emulsion may be used.

For example, an emulsion in water of polypropylene having a hydrophilic group introduced therein may be used for the polypropylene emulsion. Examples of the hydrophilic group include carboxy group, sulfonate group, phosphate group, hydroxy group, and amino group.

A polypropylene emulsion prepared by dispersing polypropylene in water with an emulsifying dispersant may also be used.

The emulsifying dispersant used may be the same as the one described for the acrylic emulsion.

The polypropylene preferably has a melting point of 90 to 150° C. and a weight average molecular weight of 1,000 to 1,000,000.

In the present invention, a commercially available product may be used for the polypropylene emulsion and examples thereof include PP emulsion manufactured by Maruyoshi Kasei K.K.

The ethylene-propylene copolymer emulsion is not particularly limited, and any known ethylene-propylene copolymer emulsion may be used.

For example, an emulsion in water of an ethylene propylene copolymer having a hydrophilic group introduced therein may be used for the ethylene-propylene copolymer emulsion. Examples of the hydrophilic group include carboxy group, sulfonate group, phosphate group, hydroxy group, and amino group.

An ethylene-propylene copolymer emulsion prepared by dispersing an ethylene-propylene copolymer in water with an emulsifying dispersant may also be used.

The emulsifying dispersant used may be the same as the one described for the acrylic emulsion.

The ethylene-propylene copolymer preferably has a melting point of 90 to 150° C. and a weight average molecular weight of 1,000 to 1,000,000.

In the present invention, a commercially available product may be used for the ethylene-propylene copolymer F emulsion and examples of such product include HS manufactured by Regitex Co., Ltd.

The polybutene emulsion is not particularly limited, and any known polybutene emulsion may be used.

For example, an emulsion in water of polybutene having a hydrophilic group introduced therein may be used for the polybutene emulsion. Examples of the hydrophilic group include carboxy group, sulfonate group, phosphate group, hydroxy group, and amino group.

A polybutene emulsion prepared by dispersing polybutene in water with an emulsifying dispersant may also be used.

The emulsifying dispersant used may be the same as the one described for the acrylic emulsion.

An example of the polybutene emulsion includes an emulsified product prepared from polybutene and water, which contains a polymer having a structural unit based on a methacrylate containing a phosphorylcholine-analogous group represented by the following formula (2):

(2)

wherein $R^3$ is —$(CH_2)_m$- or —$(CH_2CH_2O)_n$—$CH_2CH_2$—, and m and n are each an integer of 1 to 10. This polymer is hereinafter referred to as the "polymer (D)".

Examples of the monomer represented by the formula (2) include 2-methacryloyloxyethyl-2'-(trimethylammonio)ethyl phosphate, 3-methacryloyloxypropyl-2'-(trimethylammonio)ethyl phosphate, 4-methacryloyloxybutyl-2'-(trimethylammonio)ethyl phosphate, 2-methacryloyloxyethoxyethyl-2'-(trimethylammonio)ethyl phosphates and 2-methacryloyloxydiethoxyethyl-2'-(trimethylammonio)ethyl phosphate. These may be used alone or in combination of two or more.

Among these, 2-methacryloyloxyethyl-2'-(trimethylammonio)ethyl phosphate is preferable.

The polymer (D) is a homopolymer prepared by singly polymerizing a monomer represented by the formula (2) or a copolymer prepared by copolymerizing it with any other copolymerizable vinyl monomer.

Examples of the other copolymerizable vinyl monomer include styrene monomers such as styrene, methylstyrene, and chlorostyrene; vinyl ether monomers such as vinyl acetate and vinyl propionate; alkyl(meth)acrylate monomers such as methyl(meth)acrylate, ethyl(meth)acrylate, n-butyl (meth)acrylate, lauryl(meth)acrylate, stearyl (meth)acrylate, and 2-ethylhexyl (meth)acrylate; (meth)acrylic acid; functional group-containing (meth)acrylates such as 2-hydroxyethyl (meth)acrylate and glycerol (meth)acrylate; polyalkylene glycol (meth)acrylates such as polyethylene glycol (meth)acrylate and polypropylene glycol (meth)acrylate; and nitrogen-containing monomers such as (meth)acrylamide, N-vinylpyrrolidone, and acrylonitrile. These may be used alone or in combination of two or more.

Among these, a (meth)acrylate monomer is preferable in terms of the controlled balance between the hydrophilicity and the hydrophobicity of the polymer (D) and the copolymerization property at the time of reaction. A (meth)acrylate monomer having 1 to 24 carbon atoms in the alkyl chain is preferable in terms of the stability of the polybutene emulsion.

When the monomer represented by the formula (2) is copolymerized with any other monomer, the content of the monomer represented by the formula (2) is preferably 1 to 90% by weight and more preferably 5 to 80% by weight. When the content falls within the range, the resulting copolymer can sufficiently exhibit the properties of both the monomers.

The polymer (D) serves as a dispersant or an emulsifier for dispersing or emulsifying polybutene in water, and it also serves as a stabilizer for a filler, a drug, or the like to be optionally added. In addition, the polymer (D) is inactive to the biological components and is less pungent, and hence can be safely used.

The polymer (D) can be obtained by polymerizing the respective monomer components described above in an inert gas atmosphere such as nitrogen, carbon dioxide or helium in the presence of a radical polymerization initiator, by any known method such as mass polymerization, suspension polymerization, emulsion polymerizations and solution polymerization.

Examples of the polymerization initiator include, but are not specifically limited to, benzoyl peroxide, lauroyl peroxide, diisopropyl peroxydicarbonate, t-butyl peroxy-2-ethylhexanoate, t-butyl peroxypivalate, t-butyl peroxydiisobutyrate, azobisisobutyronitrile, azoisobis dimethylvaleronitrile, persulfate, and persulfate-bisulfite.

The polymerization initiator is preferably charged in an amount of 0.0001 to 10 parts by weight and more preferably 0.01 to 5 parts by weight with respect to 100 parts by weight of the monomer component.

The polymerization is preferably carried out at a temperature of 20 to 100° C. for 0.5 to 72 hours.

The polymer (D) has a weight average molecular weight of preferably 1,000 to 5,000,000 and more preferably 10,000 to 1,000,000 in terms of the compatibility with polybutene or water and the viscosity of the compound.

The polybutene may be an isobutylene homopolymer, a copolymer of isobutylene with its isomer, a copolymer of isobutylene with another olefin, a copolymer of isobutylene with its isomer and another olefin, or a hydride thereof. These may be used alone or in combination of two or more. Of these, hydrogenated polybutene, which is a hydride, is hardly subject to oxidative degradation due to heat or light and is therefore preferable.

Examples of the isomer include 1-butene, cis-2-butene, and trans-2-butene.

The polybutene may be produced, for example, by polymerizing a gas mixture containing isobutylene with an acid catalyst such as aluminum chloride and optionally hydrogenating the polymer.

Polybutenes of low-viscosity to high-viscosity can be produced by adjusting the amount of catalyst to be added and the reaction temperature in the polybutene production process.

Polybutene is an oily polymer which is a very safe material inactive to biological components as well and can impart sealing properties.

The polybutene is preferably of a liquid type or a viscous type, and more preferably of a liquid type for the preparation of an emulsified product.

The polybutene preferably has a number average molecular weight of 150 to 4,000 because such polybutene exhibits liquidity or viscosity.

The content of the polymer (D) is preferably 1 to 50% by weight and more preferably 2 to 40% by weight. Within this range, the emulsified product is excellent in stability and is not excessively viscous.

The content of the polybutene is preferably 10 to 90% by weight and more preferably 20 to 80% by weight.

The content of water is preferably 9 to 89% by weight.

It is preferable for the emulsified product to further include a surfactant. Addition of a surfactant allows the emulsified product to have an improved stability.

Examples of the surfactant include a nonionic surfactant, an anionic surfactant, a cationic surfactant, and an amphoteric surfactant.

The nonionic surfactant, anionic surfactant, cationic surfactant, and amphoteric surfactant are respectively as defined above.

The surfactants may be used alone or in combination of two or more.

In such surfactants, a fatty acid having an alkyl group which preferably has a carbon chain length of $C_8$ to $C_{18}$ is preferable.

The amount of surfactant to be added is preferably 0.01 to 10% by weight and more preferably 0.1 to 2% by weight. Within this range, addition of the surfactant achieves sufficiently high effect while ensuring high safety to cause less skin irritation.

The emulsified product may include any of various additives as far as the objects of the present invention can be achieved.

Examples of the additives include oily materials such as vegetable oils and fats, animal oils and fats, waxes, paraffins except polybutene, vaseline, fatty acid esters, higher fatty acids, and higher alcohols; inorganic compounds such as titanium oxide, zinc oxide, talc, silica, kaolin, sodium carbonate, and borax; organic solvents such as ethanol, isopropanol, ethylene glycol, propylene glycol, and glycerin; and water-soluble polymers such as polyethylene glycol, polypropylene glycol, polyvinyl alcohol, polyvinylpyrrolidone, carboxymethyl cellulose, a block copolymer of ethylene oxide and propylene oxide, and a copolymer of maleic anhydride and methyl vinyl ether.

The method of preparing the emulsified product may be carried out by any known method without any particular limitation. For example, the emulsified product can be produced by emulsifying the polybutene, the polymer (D), water, and optionally the surfactant and any of the various additives at a temperature ranging from room temperature to 90° C. in an emulsifier (e.g., homogenizer or homomixer) or kneader.

In the present invention, a commercially available product may be used for the polybutene emulsion and exemplary such polybutene emulsions include EMAWET 10E and EMAWET 30SE (manufactured by NOF Corporation).

<Ethylene-vinyl Acetate Emulsion>

For the ethylene-vinyl acetate emulsion (hereinafter, referred to as the "EVA emulsion"), conventionally known EVA emulsions may be used without any particular limitation.

A preferable example of the EVA emulsion includes an aqueous emulsion prepared by copolymerizing (emulsion polymerizing) ethylene and vinyl acetate monomer in the presence of an emulsifying dispersant.

The weight ratio between the ethylene and the vinyl acetate monomer (ethylene/vinyl acetate monomer) to be blended for copolymerization is preferably 40/60 to 70/30.

In the present invention, other monomers may be optionally used to carry out copolymerization. Exemplary such monomers include acrylates such as 2-ethylhexyl acrylate, butyl acrylate, and ethyl acrylate; methacrylates such as methyl methacrylate and butyl methacrylate; and vinyl esters such as vinyl chloride and vinyl versatate. Various other monomers may also be used, as exemplified by carboxy group-containing monomers such as acrylic acid and methacrylic acid; and monomers having functional groups such as sulfonate group, hydroxy group, epoxy group, methylol group, amino group, and amide group.

The emulsifying dispersant used may be the same as the one used for the acrylic emulsion. It is preferable to use a water-soluble polymer and more preferably polyvinyl alcohol (PVA).

The EVA emulsion has a weight average molecular weight of preferably 10,000 to 500,000 and more preferably 50,000 to 200,000.

The EVA emulsion has a solid content of preferably 40 to 70% by weight and more preferably 50 to 65% by weight.

In the present invention, a commercially available product may be used for the EVA emulsion and exemplary such products include ethylene-vinyl acetate emulsions (Sumikatlex S7400, S400HQ, S467, 510HQ, 1010, S401HQ, S408HQE, S-950) manufactured by Sumika Chemtex Co., Ltd.

<Vinyl Acetate Emulsion>

Conventionally known vinyl acetate emulsions may be used without any particular limitation for the vinyl acetate emulsion.

Preferable examples off the vinyl acetate emulsion include an aqueous emulsion prepared by polymerizing (emulsion polymerizing) vinyl acetate in the presence of an emulsifying dispersant.

In the present invention, other monomers may be optionally used to carry out the copolymerization. Specific examples of such monomers include ethylenic compounds such as ethylene and propylene; acrylates such as 2-ethylhexyl acrylate, butyl acrylate, and ethyl acrylate; methacrylates such as methyl methacrylate and butyl methacrylate; and vinyl esters such as vinyl chloride and vinyl versatate. Various other monomers may also be used, as exemplified by carboxy group-containing monomers such as acrylic acid and methacrylic acid; and monomers having functional groups such as sulfonate group, hydroxy group, epoxy group, methylol group, amino group, and amide group.

The emulsifying dispersant used may be the same as the one described for the EVA emulsion.

The vinyl acetate emulsion has a weight average molecular weight of preferably 10,000 to 500,000 and more preferably 50,000 to 200,000.

The vinyl acetate emulsion has a solid content of preferably 40 to 70% by weight and more preferably 50 to 65% by weight.

In the present invention, a commercially available product may be used for the vinyl acetate emulsion and an example thereof includes PEGAR manufactured by KOATSU GAS KOGYO CO., LTD.

<Polyvinyl Chloride Emulsion>

Conventionally known polyvinyl chloride emulsions may be used without any particular limitation for the polyvinyl chloride emulsion.

A preferable example of the polyvinyl chloride emulsion includes an aqueous emulsion prepared by polymerizing (emulsion polymerizing) vinyl chloride in the presence of an emulsifying dispersant.

In the present invention, other monomers may be optionally used to carry out copolymerization. Specific examples of such monomers include ethylenic compounds such as ethylene and propylene; acrylates such as 2-ethylhexyl acrylate, butyl acrylate, and ethyl acrylate; and methacrylates such as methyl methacrylate and butyl methacrylate. Various other monomers may also be used, as exemplified by carboxy group-containing monomers such as acrylic acid and methacrylic acid; and monomers having functional groups such as sulfonate group, hydroxy group, epoxy group, methylol group, amino group, and amide group.

The emulsifying dispersant used may be the same as the one described for the EVA emulsion.

The polyvinyl chloride emulsion may have a weight average molecular weight of preferably 10,000 to 500,000 and more preferably 50,000 to 200,000.

The polyvinyl chloride emulsion has a solid content of preferably 40 to 70% by weight and more preferably 50 to 65% by weight.

In the present invention, a commercially available product may be used for the polyvinyl chloride emulsion and an example thereof includes SE-1010 manufactured by Sumika Chemtex Co., Ltd.

En the present invention, when the emulsion particles are those obtained by using a nonionic surfactant for the emulsifying dispersant, the mineral will exhibit high interaction with the emulsion particles by forming hydrogen bond, and highly efficient aggregation of the emulsion particles will be realized to enable convenient recovery of the tire puncture sealant from the tire.

When the emulsion particles are those obtained by using a nonionic surfactant which has hydroxy group in its molecule such as polyvinyl alcohol (PVA) or hydroxyethyl cellulose (HEC), the emulsion particles will be aggregated when the mineral has a positive surface charge because electrostatic attraction is generated between the oxygen atom in the nonionic surfactant and the mineral. When the mineral has a negative surface charge, the emulsion will also be aggregated by the electrostatic attraction generated between the hydrogen atom in the nonionic surfactant and the mineral.

In particular, when the emulsion particles are present as an EVA emulsion containing polyvinyl alcohol (PVA) for the nonionic surfactant, the mineral will have higher interaction with the emulsion particles by forming hydrogen bond than the action of weakening the surface charge of the emulsion particles, and the emulsion particles will be efficiently aggregated by both the interaction of the mineral with the emulsion particles by hydrogen bond formation and the weakened surface charge of the emulsion particles to thereby enable convenient recovery of the tire puncture sealant from the tire.

Next, the antifreezing agent is described.

Exemplary antifreezing agents that may be used in the tire puncture sealant incorporated in the tire puncture sealant set of the present invention include ethylene glycol, propylene glycol and diethylene glycol. These may be used alone or in combination of two or more.

The antifreezing agent is preferably at least one member selected from the group consisting of ethylene glycol, propylene glycol, and diethylene glycol in view of the prominent effect of reducing the freezing point.

The content of the antifreezing agent is preferably 100 to 500 parts by weight, more preferably 120 to 350 parts by weight, and still more preferably 140 to 300 parts by weight with respect to 100 parts by weight of the solid content of the emulsion in terms of its excellent performance in preventing the tire puncture sealant from freezing.

It is preferable for the tire puncture sealant incorporated in the tire puncture sealant set according to the present invention to further include a tackifier in terms of its excellent sealing properties.

Exemplary such tackifiers include rosin resins, polymerized rosin resins, rosin ester resins, polymerized rosin ester resins, modified rosins and other rosin resins; terpene phenol resins; terpene resins such as aromatic terpene; hydrogenated terpene resins prepared through hydrogenation of the terpene resins; phenol resins; and xylene resins.

In addition, an emulsion obtained by emulsifying any of these resins is one of preferred embodiments in terms of its excellent compatibility with the emulsion included in the tire puncture sealant. These may be used alone or in combination of two or more.

An emulsion of at least one member selected from the group consisting of rosin resin, polymerized rosin resin, rosin ester resin, terpene resin, and terpene phenol resin is preferably used in terms of its excellent sealing properties.

The solid content of the tackifier is preferably 50 to 200 parts by weight, more preferably 70 to 200 parts by weight, and still more preferably 80 to 180 parts by weight with respect to 100 parts by weight of the solid content of the emulsion in terms of its excellent sealing properties.

The solid content of the tackifier as used herein refers to the total amount of the respective components in the tackifier with the exclusion of water and a solvent.

The solid content of the emulsion as used herein refers to the total amount of the respective components in the emulsion with the exclusion of water and a solvent.

In addition to the respective components as described above, the tire puncture sealant may contain as desired any of various additives including a filler, an antiaging agent, an antioxidant, a pigment (dye), a plasticizer, a thixotropic agent, a UV absorber, a flame retardant, a surfactant (including a leveling agent), a dispersant, a dehydrating agent, and an antistatic agent.

The additives mentioned above are as defined above for the emulsion coagulant of the present invention.

The tire puncture sealant incorporated in the tire puncture sealant set of the present invention may preferably have a pH of 5.5 to 8.5. When the pH is within this range, steel cord is hardly corroded. Also, when an emulsion which is relatively stable within such pH range is employed, the amount of ammonia to be added can be reduced or its addition is not necessary, so there is less pungent odor.

Because of these excellent properties, the tire puncture sealant may have a pH of preferably 6.0 to 8.0 and more preferably 6.5 to 8.0.

An acid or a base may be added to the tire puncture sealant to adjust its pH to fall within the above-mentioned range.

Examples of the acid include, but are not particularly limited to, inorganic acids such as hydrochloric acid, sulfuric acid, nitric acid, phosphoric acid, and phosphorous acid; and organic acids such as acetic acid, propionic acid, formic acid, butyric acid, lactic acid, malic acid, and citric acid. The acids may be used alone or in combination of two or more.

Preferable examples of the base include, but are not particularly limited to, those having no pungent odor, specifically, sodium hydroxide, potassium hydroxide, and tertiary amine. These may be used alone or in combination of two or more. Among these, triethylamine is preferable in terms of the safety and water resistance after sealing.

The method for producing the tire puncture sealant incorporated in the tire puncture sealant set of the present invention is not particularly limited, but may be, for example, a method in which the emulsion particles, the antifreezing agent, the tackifier, and any of the various optional additives are incorporated in a reaction vessel and then sufficiently mixed under reduced pressure with a stirring device such as a blander.

The emulsion coagulant incorporated in the tire puncture sealant set of the present invention is not particularly limited as long as it is the emulsion coagulant of the present invention.

An exemplary combination of the mineral in the emulsion coagulant and the emulsion particles in the tire puncture sealant is a combination of emulsion particles capable of undergoing an interaction, for example, formation of hydrogen bond with the surface of the mineral as in nonionic emulsions such as EVA emulsion, (neutral) vinyl acetate emulsion and (neutral) polyvinyl chloride emulsion, with an anionic mineral which is at least one member selected from the group consisting of alumina, sodium silicate, magnesium silicate, aluminum silicate, water glass, montmorillonite, bentonite, and zeolite.

When the emulsion particles are strongly alkaline particles having a positive surface charge as in NR latex, or have a nonionic surface charge as in EVA emulsion, vinyl acetate emulsion or polyvinyl chloride emulsion (the EVA emulsion, vinyl acetate emulsion and polyvinyl chloride emulsion having a surface charge of around zero), examples of the mineral combined with such emulsion particles include anionic minerals such as alumina, sodium silicate, magnesium silicate, aluminum silicate, water glass, montmorillonite, bentonite, and zeolite.

When the emulsion particles are anionic particles having a negative surface charge as in acrylic emulsion, urethane emulsion or polyolefin emulsion, the mineral combined may be a cationic mineral such as calcium carbonate.

When the emulsion particles have a nonionic surfactant, examples of the mineral combined with such emulsion particles include anionic minerals such as alumina, sodium silicate, magnesium silicate, aluminum silicate, water glass, montmorillonite, bentonite, and zeolite.

In the tire puncture sealant set of the present invention, the emulsion coagulant is used in an amount of 6 to 40 parts by weight, and more preferably 10 to 30 parts by weight in relation to 100 parts by weight of the tire puncture sealant in view of facilitating aggregation of the emulsion particles in the tire puncture sealant, gelation of the mixture of the emulsion coagulant and the tire puncture sealant, and recovery of the tire puncture sealant from the tire to enable disposal of the recovered puncture sealant.

In the case where the mineral in the emulsion coagulant is at least one member selected from the group consisting of silicates except sodium silicate, oxides, and carbonates, the weight ratio of the mineral to the gelation agent (the mineral/the gelation agent) is preferably in the range of 3/3 to 20/20, and more preferably 10/10 to 20/20 in relation to 100 parts by weight of the tire puncture sealant in view of facilitating aggregation of the emulsion particles in the tire puncture sealant, gelation of the mixture of the emulsion coagulant and the tire puncture sealant, and recovery of the tire puncture sealant from the tire to enable disposal of the recovered puncture sealant.

In the case where the mineral contained in the emulsion coagulant is sodium silicate, the weight ratio of the sodium silicate to the gelation agent (the sodium silicate (parts by weight)/the gelation agent (parts by weight)) is preferably in the range of 50/3 to 100/20, and more preferably 100/8 to 100/17 in relation to 100 parts by weight of the tire puncture sealant in view of facilitating aggregation of the emulsion particles in the tire puncture sealant, gelation of the mixture of the emulsion coagulant and the tire puncture sealant, and recovery of the tire puncture sealant from the tire to enable disposal of the recovered puncture sealant.

According to the tire puncture sealant set of the present invention, the tire puncture sealant can be used to promptly repair a punctured tire to continue driving, and when the repaired tire is recycled, the tire puncture sealant remaining in the tire can be coagulated and solidified in a short time with the emulsion coagulant to enable efficient recovery of the tire puncture sealant for its disposal as general waste.

Next, the method for recovering a tire puncture sealant according to the present invention is described.

The method for recovering a tire puncture sealant of the present invention comprises the steps of:

adding the emulsion coagulant of the present invention to the tire puncture sealant in a tire, coagulating the tire puncture sealant with the emulsion coagulant to produce a coagulation product, and recovering the coagulation product from the tire.

The tire puncture sealant used in the method for recovering the tire puncture sealant of the present invention is not particularly limited, and exemplary sealants include those included in the tire puncture sealant set of the present invention.

Next, the step of repairing the puncture of the flat tire by using the tire puncture sealant of the present invention is described.

The repair step is not particularly limited, in an exemplary procedure, the tire puncture sealant is injected into a tire of a car through an air-charge inlet of the tire, the tire is filled with air to a predetermined air pressure, and then the car is driven so that the emulsion coagulates by the compression and shearing forces that the tire receives when it rotates and touches the ground to thereby seal the puncture hole with the aggregate and repair the tire.

The method used for injecting the tire puncture sealant in the tire is not particularly limited, and any conventionally known method may be used, as exemplified by a method using a syringe, a spray can, or the like.

The amount of the tire puncture sealant to be injected into the tire is not particularly limited, and the amount may be selected as appropriate for the size of a puncture or the like.

In most cases, after the repair, the tire puncture sealant remains in the tire in liquid state without solidification.

Next, the recovery method of the tire puncture sealant of the present invention is described by referring to the drawings, which by no means limit the scope of the tire puncture sealant recovery method of the present invention.

After the step of repairing the tire with the tire puncture sealant, the emulsion coagulant of the present invention is added to the tire puncture sealant in the tire in the next step.

The repaired tire is preliminarily separated from the rim.

Figure 1:
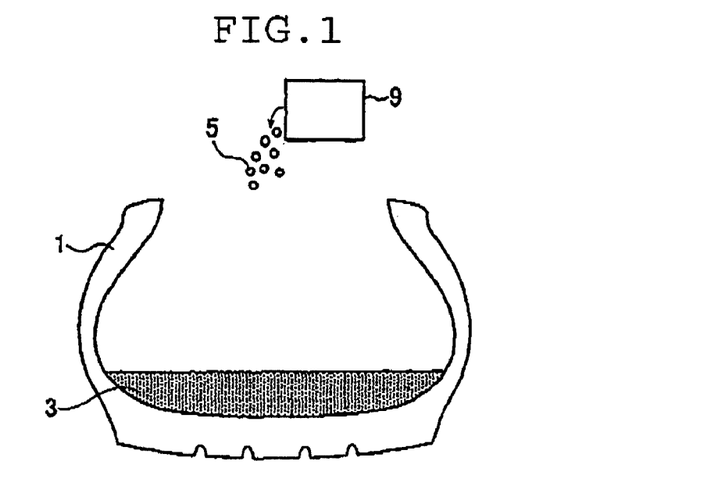
FIG. 1 is a cross sectional view schematically showing a part of a tire separated from the rim in standing in vertical direction.

FIG. 1 is a cross sectional view schematically showing a part of the tire separated from the rim in standing in vertical direction.

In FIG. 1, a repaired tire 1 has a liquid tire puncture sealant 3 remaining in the tire without coagulation. An emulsion coagulant 5 in a container 9 is added to this tire puncture sealant 3, and the mixture is stirred (not shown). The emulsion coagulant 5 may be in the form of liquid or powder.

After the addition of the emulsion coagulant, the tire puncture sealant is coagulated with the emulsion coagulant in the coagulation step to form a coagulation product.

Figure 2:
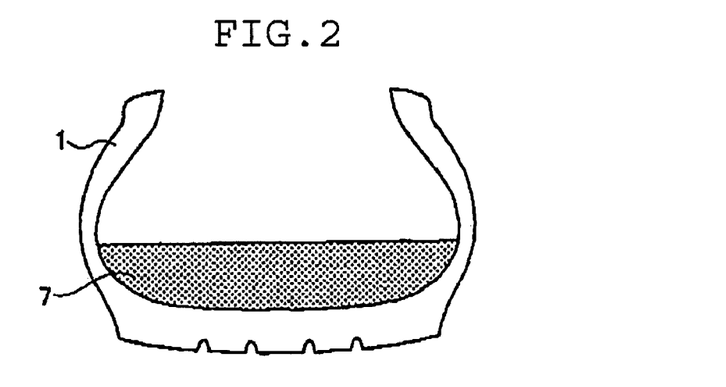
FIG. 2 is a cross sectional view schematically showing the mixture of the tire puncture sealant and the emulsion coagulant in the tire.

FIG. 2 is a cross sectional view schematically showing the mixture of the tire puncture sealant and the emulsion coagulant in the tire.

In FIG. 2, the mixture 7 of the tire puncture sealant and the emulsion coagulant coagulates into the coagulation product 7.

The coagulation may be carried out at room temperature, or under the conditions of −20° C. to 80° C.

The coagulation may be accomplished in a period of less than 20 minutes. More specifically, the time required for the coagulation (the time required after the mixing of the tire puncture sealant and the emulsion coagulant until the accomplishment of the coagulation when the coagulation product can be readily removed with a spatula) depends on the amount of the tire puncture sealant. However, at a temperature of 20° C., the coagulation may be accomplished within 15 minutes (preferably within 5 minutes), and at −20° C., the coagulation may be accomplished within 10 minutes (for example, in 5 to 10 minutes).

After the coagulation, the coagulation product is taken out of the tire in the recovery step.

Figure 3:
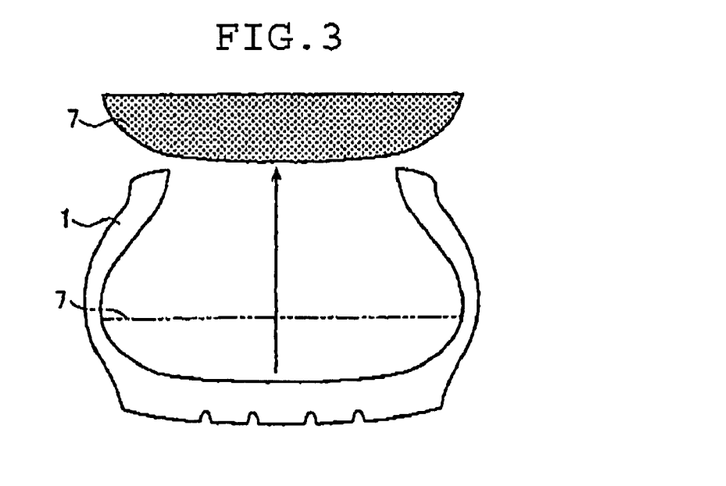
FIG. 3 is a cross sectional view schematically showing the recovery of the coagulation product from the tire.

FIG. 3 is a cross sectional view schematically showing the recovery of the coagulation product from the tire.

In this step, the coagulation product 7 shown in FIG. 2 is separated from the tire 1 by using a tool such as spatula (not shown) and the coagulation product 7 is taken out of the tire 1 as shown in FIG. 3. The recovered coagulation product 7 is shown in FIG. 3.

The recovered product is either solid or quasi-solid, and it can be discarded as general waste.

The method for recovering the tire puncture sealant of the present invention enables efficient recovery of the tire puncture sealant remaining in the tire in a short time and recycling of the tire puncture sealant having fewer stains with easy handling. In addition, the recovered sealant is in the form of a solid or gel and can be discarded as general waste. Accordingly, the present method is environmentally advantageous.

EXAMPLES

Next, the present invention is described in detail by way of Examples. The present invention, however, is not limited by these Examples.

1. Production of Emulsion Coagulant

The respective components of the emulsion coagulant listed in Table 1 below were mixed in the amounts (unit, part by weight) shown in Table 1, to thereby produce each emulsion coagulant.

2. Production of Tire Puncture Sealant

Next, the respective components of the tire puncture sealant listed in Table 1 below were mixed in a blender in the amounts (unit, part by weight) shown in Table 1, to thereby produce each tire puncture sealant.

3. Evaluation

The thus prepared tire puncture sealant was used in the amount (500 g) shown in Table 1. The tire puncture sealant was injected in a tire from which the rim had been removed. Next, the emulsion coagulant that had been prepared as described above was injected in the amount shown in Table 1 (unit, g), and the emulsion coagulant was stirred with a spatula. The time (unit, minute) required until the coagulation product became easily removable from the tire with the spatula was measured under the condition of 20° C.

The results are shown in Table 1.

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| Tire puncture sealant | Emulsion | 1 | 42.6 | 42.6 | 42.6 | 42.6 | 42.6 | 42.6 | 42.6 | 42.6 | 42.6 | 42.6 |
| | | 2 | | | | | | | | | | |
| | Tackifier | 1 | 11.4 | 11.4 | 11.4 | 11.4 | 11.4 | 11.4 | 11.4 | 11.4 | 11.4 | 11.4 |
| | | 2 | | | | | | | | | | |
| | | 3 | | | | | | | | | | |
| | Antifreezing agent | 1 | 46.0 | 46.0 | 46.0 | 46.0 | 46.0 | 46.0 | 46.0 | 46.0 | 46.0 | 46.0 |
| | | 2 | | | | | | | | | | |
| | | 3 | | | | | | | | | | |
| | Total (Parts by weight) | | 100 | 100 | 100 | 100 | 100 | 100 | 100 | 100 | 100 | 100 |
| | Amount of use (g) | | 500 | 500 | 500 | 500 | 500 | 500 | 500 | 500 | 500 | 500 |
| Emulsion coagulant | Mineral | 1 | 10.0 | | | | 5.0 | 5.0 | 5.0 | 5.0 | 5.0 | 5.0 |
| | | 2 | | 10.0 | | | | | | | | |
| | | 3 | | | 10.0 | | | | | | | |
| | | 4 | | | | 10.0 | | | | | | |
| | Calcium carbonate | | | | | | | | | | | |
| | Silica | | | | | | | | | | | |
| | Gelation agent | 1 | 10.0 | 10.0 | 10.0 | 10.0 | 5.0 | | | | | |
| | | 2 | | | | | | 5.0 | | | | |
| | | 3 | | | | | | | 5.0 | | | |
| | | 4 | | | | | | | | 5.0 | | |
| | | 5 | | | | | | | | | 5.0 | |
| | | 6 | | | | | | | | | | 5.0 |
| | Amount of use (g) | | 100 | 100 | 100 | 100 | 50 | 50 | 50 | 50 | 50 | 50 |
| Solidification time at 20° C. (min) | | | 5 | 5 | 5 | 5 | 15 | 10 | 10 | 15 | 15 | 10 |

TABLE 1-continued

|  |  |  | Example |  |  |  |  |  |  |  |
|---|---|---|---|---|---|---|---|---|---|---|
|  |  |  | 11 | 12 | 13 | 14 | 15 | 16 | 17 | 18 |
| Tire puncture sealant | Emulsion | 1 | 42.6 | 42.6 | 42.6 | 42.6 |  | 42.6 | 42.6 | 42.6 |
|  |  | 2 |  |  |  |  | 42.6 |  |  |  |
|  | Tackifier | 1 | 11.4 | 11.4 | 11.4 |  | 11.4 | 11.4 |  | 11.4 |
|  |  | 2 |  |  |  | 11.4 |  |  |  |  |
|  |  | 3 |  |  |  |  |  |  | 11.4 |  |
|  | Antifreezing agent | 1 | 46.0 | 46.0 | 46.0 | 46.0 | 46.0 |  |  |  |
|  |  | 2 |  |  |  |  |  | 46.0 | 46.0 |  |
|  |  | 3 |  |  |  |  |  |  |  | 46.0 |
|  | Total (Parts by weight) |  | 100 | 100 | 100 | 100 | 100 | 100 | 100 | 100 |
|  | Amount of use (g) |  | 500 | 500 | 500 | 500 | 500 | 500 | 500 | 500 |
| Emulsion coagulant | Mineral | 1 | 20.0 | 20.0 | 3.0 | 10.0 | 10.0 | 10.0 | 10.0 | 10.0 |
|  |  | 2 |  |  |  |  |  |  |  |  |
|  |  | 3 |  |  |  |  |  |  |  |  |
|  |  | 4 |  |  |  |  |  |  |  |  |
|  | Calcium carbonate |  |  |  |  |  |  |  |  |  |
|  | Silica |  |  |  |  |  |  |  |  |  |
|  | Gelation agent | 1 | 5.0 | 20.0 | 3.0 | 10.0 | 10.0 | 10.0 | 10.0 | 10.0 |
|  |  | 2 |  |  |  |  |  |  |  |  |
|  |  | 3 |  |  |  |  |  |  |  |  |
|  |  | 4 |  |  |  |  |  |  |  |  |
|  |  | 5 |  |  |  |  |  |  |  |  |
|  |  | 6 |  |  |  |  |  |  |  |  |
|  | Amount of use (g) |  | 125 | 200 | 30 | 100 | 100 | 100 | 100 | 100 |
|  | Solidification time at 20° C. (min) |  | 5 | 2 | 15 | 5 | 5 | 5 | 5 | 5 |

|  |  |  | Comparative Example |  |  |  |  |  |  |  |  |  |
|---|---|---|---|---|---|---|---|---|---|---|---|---|
|  |  |  | 1 | 2 | 3 | 4 | 5 | 6 | 7 | 8 | 9 | 10 |
| Tire puncture sealant | Emulsion | 1 | 42.6 | 42.6 | 42.6 | 42.6 | 42.6 | 42.6 | 42.6 | 42.6 | 42.6 | 42.6 |
|  |  | 2 |  |  |  |  |  |  |  |  |  |  |
|  | Tackifier | 1 | 11.4 | 11.4 | 11.4 | 11.4 | 11.4 | 11.4 | 11.4 | 11.4 | 11.4 | 11.4 |
|  |  | 2 |  |  |  |  |  |  |  |  |  |  |
|  |  | 3 |  |  |  |  |  |  |  |  |  |  |
|  | Antifreezing agent | 1 | 46.0 | 46.0 | 46.0 | 46.0 | 46.0 | 46.0 | 46.0 | 46.0 | 46.0 | 46.0 |
|  |  | 2 |  |  |  |  |  |  |  |  |  |  |
|  |  | 3 |  |  |  |  |  |  |  |  |  |  |
|  | Total(Parts by weight) |  | 100 | 100 | 100 | 100 | 100 | 100 | 100 | 100 | 100 | 100 |
|  | Amount of use (g) |  | 500 | 500 | 500 | 500 | 500 | 500 | 500 | 500 | 500 | 500 |
| Emulsion coagulant | Mineral | 1 | 20.0 |  |  |  |  |  |  |  |  |  |
|  |  | 2 |  | 20.0 |  |  |  |  |  |  |  |  |
|  |  | 3 |  |  | 20.0 |  |  |  |  |  |  |  |
|  |  | 4 |  |  |  | 20.0 |  |  |  |  |  |  |
|  | Calcium carbonate |  |  |  |  |  | 20.0 |  |  |  |  |  |
|  | Silica |  |  |  |  |  |  | 5.0 |  |  |  |  |
|  | Gelation agent | 1 |  |  |  |  |  |  | 20.0 |  |  |  |
|  |  | 2 |  |  |  |  |  |  |  | 20.0 |  |  |
|  |  | 3 |  |  |  |  |  |  |  |  | 20.0 |  |
|  |  | 4 |  |  |  |  |  |  |  |  |  | 20.0 |
|  |  | 5 |  |  |  |  |  |  |  |  |  |  |
|  |  | 6 |  |  |  |  |  |  |  |  |  |  |
|  | Amount of use (g) |  | 100 | 100 | 100 | 100 | 100 | 25 | 100 | 100 | 100 | 100 |
|  | Solidification time at 20° C. (min) |  | — | — | — | — | — | — | 20 | 20 | 30 | 30< |
|  | Appearance |  | Precipitation | Precipitation | Precipitation | Precipitation | Precipitation | Precipitation |  |  |  |  |

TABLE 1-continued

| | | | Comparative Example | | | | |
|---|---|---|---|---|---|---|---|
| | | | 11 | 12 | 13 | 14 | 15 |
| Tire puncture sealant | Emulsion | 1 | 42.6 | 42.6 | 42.6 | 42.6 | 42.6 |
| | | 2 | | | | | |
| | Tackifier | 1 | 11.4 | 11.4 | 11.4 | 11.4 | 11.4 |
| | | 2 | | | | | |
| | | 3 | | | | | |
| | Antifreezing agent | 1 | 46.0 | 46.0 | 46.0 | 46.0 | 46.0 |
| | | 2 | | | | | |
| | | 3 | | | | | |
| | Total (Parts by weight) | | 100 | 100 | 100 | 100 | 100 |
| | Amount of use (g) | | 500 | 500 | 500 | 500 | 500 |
| Emulsion coagulant | Mineral | 1 | | | | | |
| | | 2 | | | | | |
| | | 3 | | | 10.0 | | |
| | | 4 | | | | 1.0 | 5.0 |
| | Calcium carbonate | | | | 10.0 | 10.0 | 10.0 |
| | Silica | | | | | | |
| | Gelation agent | 1 | | | | | |
| | | 2 | | | | | |
| | | 3 | | | | | |
| | | 4 | | | | | |
| | | 5 | 20.0 | | | | |
| | | 6 | | 20.0 | | | |
| | Amount of use (g) | | 100 | 100 | 100 | 55 | 75 |
| Solidification time at 20° C. (min) | | | 30< | 30< | 30< | 30< | 30< |

The components used in preparing the tire puncture sealants shown in Table 1 are as described below.

Emulsion 1: EVA emulsion, Sumikaflex S-408HQE manufactured by Sumika Chemtex Co., Ltd. having a solid content of 51% by weight, pH 4.5, the emulsion particles having a positive surface charge (a zeta potential of around zero mV), Emulsion 1 including polyvinyl alcohol as a nonionic surfactant Emulsion 2: NR emulsion, HA Latex manufactured by Golden Hope having a solid content of 60% by weight, the emulsion particles having a positive surface charge (a zeta potential of +45 mV), pH 10.5, Emulsion 2 including an amide as a hydrophilic group Tackifier 1: rosin emulsion, HARIESTER 508H manufactured by Harima Chemicals, Inc. having a solid content of 55% by weight Tackifier 2; rosin ester emulsion, E720 manufactured by Arakawa Chemical Industries, Ltd. having a solid content of 55% by weight Tackifier 3: terpene emulsion, Nanolet R1050 manufactured by YASUHARA CHEMICAL Co., Ltd. having a solid content of 50% by weight Antifreezing agent 1: propylene glycol manufactured by Wako Pure Chemical Industries, Ltd. having a solid content of 100% by weight Antifreezing agent 2: ethylene glycol manufactured by Wako Pure chemical Industries, Ltd. having a solid content of 100% by weight Antifreezing agent 3; diethylene glycol manufactured by Wako Pure Chemical Industries, Ltd. having a solid content of 100% by weight When the component used is the one containing a solid content, the amount shown in Table 1 is that of the solid content.

The components used in preparing the emulsion coagulants shown in Table 1 are as described below.

Mineral 1; alumina, P2 manufactured by SASOL having a negative mineral surface charge (a zeta potential of −17 mV)

Mineral 2: bentonite, OS-1 manufactured by SASOL having a negative mineral surface charge (a zeta potential of −17 MV)

Mineral 3: magnesium silicate (magnesium trisilicate), 23N4-80 manufactured by SASOL having a negative mineral surface charge (a zeta potential of −17 mV)

Mineral 4: montmorillonite manufactured by Kunimine Industries Co., Ltd. having a negative mineral surface charge (a zeta potential of −17 mV)

Calcium carbonate; Super S manufactured by Maruo Calcium Co., Ltd. having a positive mineral surface charge Silica: S200 manufactured by Nippon Aerosil Co., Ltd. having a positive mineral surface charge Gelation agent 1: propylene glycol alginate manufactured by Wako Pure Chemical Industries, Ltd.

Gelation agent 2: polyethylene oxide, PE027 manufactured by Sumitomo Seika Chemicals Co, Ltd.

Gelation agent 3: thermoplastic water-absorbing polymer (modified polyethylene oxide), TWB manufactured by Sumitomo Seika Chemicals Co., Ltd.

Gelation agent 4: hydroxyethyl cellulose, AX15 manufactured by Sumitomo Seika Chemicals Co., Ltd.

Gelation agent 5: hydroxyethyl cellulose, AL15 manufactured by Sumitomo Seika Chemicals Co., Ltd.

Gelation agent 6: polyethylene oxide, PEO1Z manufactured by Sumitomo Seika Chemicals Co., Ltd.

As clearly demonstrated by the results of Table 1, in the case of Comparative Examples 1 to 6 not containing the gelation agent, the mixture with the tire puncture sealant did not coagulate while precipitate was formed in the mixture. Since the supernatant of the mixture contains an antifreezing agent, it cannot be discarded without further treatment. In the case of Comparative Examples 7 to 12 not containing the mineral, the mixture with the tire puncture sealant required a long time for coagulation. In the case of Comparative Examples 13 to 15 containing the mineral having a surface charge which is the same as that of the emulsion particles of the tire puncture sealant, the mixture with the tire puncture sealant required a long time for coagulation.

In contrast, the emulsion coagulants of Examples 1 to 18 mixed with the tire puncture sealants coagulated in a short time, and the coagulation products could be easily separated from the tire for their disposal.

4. Production of Emulsion Coagulant

The respective components of the emulsion coagulant listed in Table 2 below were mixed in the amounts (unit, part by weight) shown in Table 2, to thereby produce each emulsion coagulant 5. Production of Tire Puncture Sealant Next, the respective components of the tire puncture sealant listed in Table 2 below were mixed in a blender in the amounts (unit, part by weight) shown in Table 2, to thereby produce each tire puncture sealant.

6. Evaluation

The thus prepared tire puncture sealant was used in the amount (500 g) shown in Table 2. The tire puncture sealant was injected in a tire from which the rim had been removed. Next, the emulsion coagulant that had been prepared as described above was injected in the amount shown in Table 2 (unit, g), and the emulsion coagulant was stirred with a spatula. The time (unit, minute) required until the coagulation product became easily removable from the tire with the spatula was measured under the conditions of 20° C. and −20° C.

The results are shown in Table 2.

TABLE 2

| | | | Example II | | | | | | | | | |
|---|---|---|---|---|---|---|---|---|---|---|---|---|
| | | | 1 | 2 | 3 | 4 | 5 | 6 | 7 | 8 | 9 | 10 |
| Tire puncture sealant | Emulsion | 3 | 50.0 | 50.0 | 50.0 | 50.0 | 50.0 | 50.0 | 50.0 | 50.0 | 50.0 | 50.0 |
| | Tackifier | 1 | 16.7 | 16.7 | 16.7 | 16.7 | 16.7 | 16.7 | 16.7 | 16.7 | 16.7 | 16.7 |
| | | 2 | | | | | | | | | | |
| | | 3 | | | | | | | | | | |
| | Antifreezing agent | 1 | 33.3 | 33.3 | 33.3 | 33.3 | 33.3 | 33.3 | 33.3 | 33.3 | 33.3 | 33.3 |
| | | 2 | | | | | | | | | | |
| | | 3 | | | | | | | | | | |
| | Total (Parts by weight) | | 100 | 100 | 100 | 100 | 100 | 100 | 100 | 100 | 100 | 100 |
| | Amount of use (g) | | 500 | 500 | 500 | 500 | 500 | 500 | 500 | 500 | 500 | 500 |
| Emulsion coagulant | Mineral | 5 | 100 | 100 | 100 | 100 | 50.0 | 50.0 | 50.0 | 50.0 | 50.0 | 50.0 |
| | Gelation agent | 1 | 10.0 | 10.0 | 10.0 | 10.0 | 5.0 | | | | | |
| | | 2 | | | | | | 5.0 | | | | |
| | | 3 | | | | | | | 5.0 | | | |
| | | 4 | | | | | | | | 5.0 | | |
| | | 5 | | | | | | | | | 5.0 | |
| | | 6 | | | | | | | | | | 5.0 |
| | Amount of use (g) | | 550 | 550 | 550 | 550 | 275 | 275 | 275 | 275 | 275 | 275 |
| Solidification time at 20° C. (min) | | | ≦2 | ≦2 | ≦2 | ≦2 | ≦2 | 5 | 5 | 10 | 5 | 10 |
| Solidification time at −20° C. (min) | | | 5 | 5 | 5 | 5 | 5 | 10 | 10 | 10 | 10 | 10 |

| | | | Example II | | | | | | | |
|---|---|---|---|---|---|---|---|---|---|---|
| | | | 11 | 12 | 13 | 14 | 15 | 16 | 17 | 18 |
| Tire puncture sealant | Emulsion | 3 | 50.0 | 50.0 | 50.0 | 50.0 | 50.0 | 50.0 | 50.0 | 50.0 |
| | Tackifier | 1 | 16.7 | 16.7 | 16.7 | | 16.7 | 16.7 | | 16.7 |
| | | 2 | | | | 16.7 | | | | |
| | | 3 | | | | | | | 16.7 | |
| | Antifreezing agent | 1 | 33.3 | 33.3 | 33.3 | 33.3 | 33.3 | | | |
| | | 2 | | | | | | 33.3 | 33.3 | |
| | | 3 | | | | | | | | 33.3 |
| | Total (Parts by weight) | | 100 | 100 | 100 | 100 | 100 | 100 | 100 | 100 |
| | Amount of use (g) | | 500 | 500 | 500 | 500 | 500 | 500 | 500 | 500 |
| Emulsion coagulant | Mineral | 5 | 200 | 200 | 50.0 | 100 | 100 | 100 | 100 | 100 |
| | Gelation agent | 1 | 10.0 | 20.0 | 3.0 | 3.0 | 3.0 | 3.0 | 3.0 | 3.0 |
| | | 2 | | | | | | | | |
| | | 3 | | | | | | | | |
| | | 4 | | | | | | | | |
| | | 5 | | | | | | | | |
| | | 6 | | | | | | | | |
| | Amount of use (g) | | 1050 | 1100 | 265 | 515 | 515 | 515 | 515 | 515 |
| Solidification time at 20° C. (min) | | | ≦1 | ≦1 | 15 | 5 | 5 | 5 | 5 | 5 |
| Solidification time at −20° C. (min) | | | ≦2 | ≦2 | 10 | 10 | 10 | 10 | 10 | 10 |

TABLE 2-continued

| | | | Comparative Example II | | | | | | | | | |
|---|---|---|---|---|---|---|---|---|---|---|---|---|
| | | | 1 | 2 | 3 | 4 | 5 | 6 | 7 | 8 | 9 | 10 |
| Tire puncture sealant | Emulsion | 3 | 50.0 | 50.0 | 50.0 | 50.0 | 50.0 | 50.0 | 50.0 | 50.0 | 50.0 | 50.0 |
| | Tackifier | 1 | 16.7 | 16.7 | 16.7 | 16.7 | 16.7 | 16.7 | 16.7 | 16.7 | 16.7 | 16.7 |
| | | 2 | | | | | | | | | | |
| | | 3 | | | | | | | | | | |
| | Antifreezing agent | 1 | 33.3 | 33.3 | 33.3 | 33.3 | 33.3 | 33.3 | 33.3 | 33.3 | 33.3 | 33.3 |
| | | 2 | | | | | | | | | | |
| | | 3 | | | | | | | | | | |
| | Total (Parts by weight) | | 100 | 100 | 100 | 100 | 100 | 100 | 100 | 100 | 100 | 100 |
| | Amount of use (g) | | 500 | 500 | 500 | 500 | 500 | 500 | 500 | 500 | 500 | 500 |
| Emulsion coagulant | Mineral | 5 | 30.0 | | | | | | 200 | | | |
| | Gelation agent | 1 | | 3.0 | 1.0 | | | | | 20.0 | | |
| | | 2 | | | | 5.0 | 3.0 | 1.0 | | | 20.0 | |
| | | 3 | | | | | | | | | | 20.0 |
| | | 4 | | | | | | | | | | |
| | | 5 | | | | | | | | | | |
| | | 6 | | | | | | | | | | |
| | Amount of use (g) | | 150 | 15 | 5 | 25 | 15 | 5 | 1000 | 100 | 100 | 100 |
| Solidification time at 20° C. (min) | | | | Not solidified | | | | | | 20 | 20 | 20 | 30 |
| Solidification time at −20° C. (min) | | | | | | | Not solidified | | | | | |

The components used in preparing the tire puncture sealants shown in Table 2 are as described below.

Emulsion 3: EVA emulsion, Sumikaflex S510HQ manufactured by Sumika Chemtex Con, Ltd. having a solid content of 55% by weight, pH 5.0, the emulsion particles having a positive surface charge (a zeta potential of around zero mV), Emulsion 3 including polyvinyl alcohol as a nonionic surfactant Tackifier 1: rosin emulsion, HARIESTER 508H manufactured by Harima Chemicals, Inc. having a solid content of 55% by weight Tackifier 2: rosin ester emulsion, E720 manufactured by Arakawa Chemical Industries, Ltd. having a solid content of 55% by weight Tackifier 3: terpene emulsion, Nanolet R1050 manufactured by YASUHARA CHEMICAL Co., Ltd. having a solid content of 50% by weight Antifreezing agent 1; propylene glycol manufactured by Wake Pure Chemical Industries, Ltd. having a solid content of 100% by weight Antifreezing agent 2; ethylene glycol manufactured by Wako Pure Chemical Industries, Ltd. having a solid content of 100% by weight Antifreezing agent 3: diethylene glycol manufactured by Wako Pure Chemical Industries, Ltd. having a solid content of 100% by weight When the component used is the one containing a solid content, the amount shown in Table 2 is that of the solid content.

The components used in preparing the emulsion coagulants shown in Table 2 are as described below.

Mineral 5: water glass containing 60% by weight, in terms of solid content, of sodium silicate, manufactured by Wako Pure Chemical Industries, Ltd. and having a negative mineral surface charge (a zeta potential of −17 mV), Gelation agent 1: propylene glycol alginate manufactured by Wako Pure Chemical Industries, Ltd.

Gelation agent 2: polyethylene oxide, PE027 manufactured by Sumitomo Seika Chemicals Co., Ltd.

Gelation agent 3: thermoplastic water-absorbing polymer (modified polyethylene oxide), TWB manufactured by Sumitomo Seika Chemicals Co., Ltd.

Gelation agent 4; hydroxyethyl cellulose, AX15 manufactured by Sumitomo Seika Chemicals Co., Ltd.

Gelation agent 5: hydroxyethyl cellulose, AL15 manufactured by Sumitomo Seika Chemicals Co., Ltd.

Gelation agent 6: polyethylene oxide, PEO1Z manufactured by Sumitomo Seika Chemicals Co., Ltd.

As clearly demonstrated by the results of Table 2, in the case of Comparative Examples II-1 and 7 not containing the gelation agent, the mixture with the tire puncture sealant either failed to coagulate or required a long time for its coagulation. Unless coagulated, the mixture containing an antifreezing agent cannot be discarded without further treatment. In the case of Comparative Examples II-2 to 6 containing no mineral, the mixture with the tire puncture sealant did not coagulate. In the case of Comparative Examples II-8 to 10 containing no mineral but an increased amount of the gelation agent compared to Comparative Examples II-2 to 6, a long time was required under the condition of 20° C. while it failed to coagulate under the condition of −20° C.

In contrast, the emulsion coagulants of Examples II-1 to 18 mixed with the tire puncture sealants coagulated in a short time either at room temperature or at a low temperature (i.e. within 15 minutes at room temperature and within 10 minutes at a low temperature), and the coagulation products could be easily separated from the tire for their disposal.

As described above, the emulsion coagulant of the present invention enables convenient recovery (removal) of the tire puncture sealant from the tire and disposal of the recovered sealant as general waste. Therefore, the emulsion coagulant of the present invention offers a superior level of environmental advantage and safety.

7. Production of Emulsion Coagulant

The respective components of the emulsion coagulant listed in Table 3 below were mixed in the amounts (unit, part by weight) shown in Table 3, to thereby produce each emulsion coagulant.

8. Production of Tire Puncture Sealant

Next, the respective components of the tire puncture sealant listed in Table 3 below were mixed in a blender in the amounts (unit, part by weight) shown in Table 3, to thereby produce a tire puncture sealant.

9. Evaluation

The thus prepared tire puncture sealant was used in the amount (500 g) shown in Table 3. The tire puncture sealant was injected in a tire from which the rim had been removed. Next, the emulsion coagulant that had been prepared as described above was injected in the amount shown in Table 3 (unit, g), and the emulsion coagulant was stirred with a spatula. The time (unit, minute) required until the coagulation product became easily removable from the tire with the spatula was measured under the condition of 20° C. The results are shown in Table 3.

TABLE 3

|  |  | Example III | |
|---|---|---|---|
|  |  | 1 | 2 |
| Tire puncture sealant | Emulsion 1 | 50.0 | 50.0 |
|  | Tackifier 1 | 16.7 | 16.7 |
|  | Antifreezing agent 1 | 33.3 | 33.3 |
|  | Total (Parts by weight) | 100 | 100 |
|  | Amount of use (g) | 500 | 500 |
| Emulsion coagulant | Mineral 1 | 20.0 |  |
|  | Mineral 2 |  | 50.0 |
|  | Gelation agent 1 | 5.0 | 5.0 |
|  | Amont of use (g) | 100 | 100 |
|  | Solidification time at 20° C. (min) | 5 | 5 |

The components used in preparing the tire puncture sealant shown in Table 3 are as described below.

Emulsion 1: Natural rubber latex, HA Latex manufactured by Golden Hope having a solid content of 60% by weight, pH 10.5, the emulsion particles having a positive surface charge (a zeta potential of +45 mV), Emulsion 1 including an amide as a hydrophilic group Tackifier 1: rosin emulsion, HARIESTER 508H manufactured by Harima Chemicals, Inc. having a solid content of 55% by weight Antifreezing agent 1: propylene glycol manufactured by Wako Pure Chemical Industries, Ltd. having a solid content of 100% by weight When the component used is the one containing a solid content, the amount shown in Table 3 is that of the solid content.

The components used in preparing the emulsion coagulants shown in Table 3 are as described below.

Mineral 1: alumina, P2 manufactured by SASOL having a negative mineral surface charge (a zeta potential of −17 mV)

Mineral 2: water glass (containing 60% by weight, in terms of solid content, of sodium silicate, manufactured by Wako Pure Chemical Industries, Ltd. and having a negative mineral surface charge (a zeta potential of −17 mV)

Gelation agent 1: propylene glycol alginate manufactured by Wako Pure Chemical Industries, Ltd.

As clearly demonstrated by the results of Table 3, the emulsion coagulants of Examples III-1 and 2 mixed with the tire puncture sealant in which the natural rubber lax was used for the emulsion particles coagulated in a short time at room temperature (i.e. within 15 minutes at room temperature), and the coagulation products could be easily separated from the tire for their disposal.

As described above, the emulsion coagulant of the present invention enables convenient recovery (removal) of the tire puncture sealant from the tire and disposal of the recovered sealant as general waste. Therefore, the emulsion coagulant of the present invention offers a superior level of environmental advantage and safety.

What is claimed is:

1. An emulsion coagulant for coagulating a tire puncture sealant containing emulsion particles, comprising:
    a mineral which induces aggregation of the emulsion particles by either one or both of weakening of surface charge of the emulsion particles and formation of hydrogen bond between the mineral and the emulsion particles; and
    a gelation agent which is at least one member selected from the group consisting of polyethylene oxide, polypropylene oxide, and modified polymers thereof, and sodium alginate, propylene glycol alginate, and dibenzylidene sorbitol.

2. The emulsion coagulant according to claim 1, wherein the mineral is at least one member selected from the group consisting of silicate, oxide, and carbonate.

3. The emulsion coagulant according to claim 1, wherein the mineral is at least one member selected from the group consisting of alumina, sodium silicate, magnesium silicate, aluminum silicate, montmorillonite, bentonite, and zeolite.

4. The emulsion coagulant according to claim 1, wherein the gelation agent is included in an amount of 20 to 700 parts by weight in relation to 100 parts by weight of the mineral.

5. The emulsion coagulant according to claim 3, wherein the sodium silicate is at least one member selected from the group consisting of $Na_2SiO_3$, $Na_4SiO_4$, $Na_2Si_2O_5$, and $Na_2Si_4O_9$.

6. The emulsion coagulant according to claim 5, wherein the sodium silicate is in the form of an aqueous solution.

7. The emulsion coagulant according to claim 6, wherein the aqueous solution is water glass.

8. The emulsion coagulant according to claim 5, wherein the mineral is sodium silicate, and the gelation agent is included in an amount of 6 to 20 parts by weight in relation to 100 parts by solid weight of the sodium silicate.

9. A tire puncture sealant set comprising:
    a tire puncture sealant containing emulsion particles and an antifreezing agent; and
    the emulsion coagulant of claim 1.

10. The tire puncture sealant set according to claim 9, wherein the emulsion particles are present in the form of a natural rubber latex or a synthetic resin emulsion.

11. The tire puncture sealant set according to claim 9, wherein the antifreezing agent is at least one member selected from the group consisting of ethylene glycol, propylene glycol, and diethylene glycol.

12. The tire puncture sealant set according to claim 9, wherein the tire puncture sealant further comprises a tackifier, and the tackifier is in the form of an emulsion containing at least one member selected from the group consisting of rosin resin, polymerized rosin resin, rosin ester resin, terpene resin, and terpene phenol resin.

13. The tire puncture sealant set according to claim 9, wherein the amount of the emulsion coagulant is 6 to 40 parts by weight in relation to 100 parts by weight of the tire puncture sealant.

14. The tire puncture sealant set according to claim 9, wherein the mineral in the emulsion coagulant is sodium silicate, and weight ratio of the sodium silicate to the gelation agent (the sodium silicate (parts by weight)/the gelation agent (parts by weight)) is 50/3 to 200/20 in relation 100 parts by weight of the tire puncture sealant.

15. A method for recovering a tire puncture sealant from a tire, comprising the steps of:
adding the emulsion coagulant of claim 1 to the tire puncture sealant in the tire;
coagulating the tire puncture sealant with the emulsion coagulant to produce a coagulation product, and
recovering the coagulation product from the tire.

16. The emulsion coagulant according to claim 2, wherein the mineral is at least one member selected from the group consisting of alumina, sodium silicate, magnesium silicate, aluminum silicate, montmorillonite, bentonite, and zeolite.

17. The emulsion coagulant according to claim 2, wherein the gelation agent is included in an amount of 20 to 700 parts by weight in relation to 100 parts by weight of the mineral.

* * * * *